United States Patent
Djukic et al.

(10) Patent No.: US 9,819,565 B2
(45) Date of Patent: Nov. 14, 2017

(54) DYNAMIC POLICY ENGINE FOR MULTI-LAYER NETWORK MANAGEMENT

(71) Applicants: Petar Djukic, Ottawa (CA); Todd Morris, Stittsville (CA); David Jeffrey Miedema, Ottawa (CA)

(72) Inventors: Petar Djukic, Ottawa (CA); Todd Morris, Stittsville (CA); David Jeffrey Miedema, Ottawa (CA)

(73) Assignee: Ciena Corporation, Hanover, MD (US)

(\*) Notice: Subject to any disclaimer, the term of this patent is extended or adjusted under 35 U.S.C. 154(b) by 181 days.

(21) Appl. No.: 14/605,161

(22) Filed: Jan. 26, 2015

(65) Prior Publication Data

US 2016/0218948 A1 Jul. 28, 2016

(51) Int. Cl.
*G06F 15/16* (2006.01)
*H04L 12/26* (2006.01)
*H04L 12/24* (2006.01)
*H04L 12/801* (2013.01)

(52) U.S. Cl.
CPC ...... *H04L 43/0876* (2013.01); *H04L 41/0893* (2013.01); *H04L 47/12* (2013.01); *H04L 47/127* (2013.01)

(58) Field of Classification Search
CPC ..... H04L 63/10; H04L 67/2814; H04L 47/20; H04L 63/0263; H04L 63/108; H04L 41/0806; H04L 67/12; H04L 47/50; H04L 5/0007; H04L 5/14; H04L 9/3278; H04L 12/40169
See application file for complete search history.

(56) References Cited

U.S. PATENT DOCUMENTS

| 2004/0267865 | A1* | 12/2004 | Cuervo | H04L 41/0893 709/200 |
| 2005/0027837 | A1* | 2/2005 | Roese | H04L 41/0893 709/223 |
| 2006/0056618 | A1* | 3/2006 | Aggarwal | G06Q 10/0631 380/1 |
| 2013/0176846 | A1 | 7/2013 | Callard et al. | |
| 2013/0250770 | A1 | 9/2013 | Zou et al. | |

(Continued)

FOREIGN PATENT DOCUMENTS

CN 103209225 A 7/2013
EP 2787698 A2 8/2014

OTHER PUBLICATIONS

Suri, et al., "Profile-Based Routing: A New Framework for MPLS Traffic Engineering," pp. 1-11.

(Continued)

*Primary Examiner* — Djenane Bayard
(74) *Attorney, Agent, or Firm* — Clements Bernard Walker PLLC; Christopher L. Bernard; Lawrence A. Baratta, Jr.

(57) ABSTRACT

Dynamic policy systems and methods for implementing network management of a network include pre-calculating management policies for the network, in an off-line manner, based on past observed network load taking into consideration seasonality of network load, forecasts of the network load, and planned events on the network load; selecting a policy from the pre-calculated management policies, to manage the network in an on-line manner, wherein the selecting is either time-based or performance-based; and performing network management functions in the network utilizing the selected policy.

17 Claims, 14 Drawing Sheets

(56) References Cited

U.S. PATENT DOCUMENTS

| | | | | |
|---|---|---|---|---|
| 2013/0301415 | A1* | 11/2013 | Archer | H04W 28/08 370/235 |
| 2014/0099119 | A1 | 4/2014 | Wei et al. | |
| 2014/0192767 | A1 | 7/2014 | Au et al. | |
| 2014/0226467 | A1 | 8/2014 | Park | |
| 2014/0229210 | A1 | 8/2014 | Sharifian et al. | |
| 2015/0195745 | A1* | 7/2015 | Farmanbar | H04W 28/12 370/236 |
| 2016/0112579 | A1* | 4/2016 | Menezes | H04W 4/26 455/406 |
| 2016/0119379 | A1* | 4/2016 | Nadkarni | H04L 63/20 726/1 |
| 2016/0210343 | A1* | 7/2016 | Certain | G06F 17/30088 |

OTHER PUBLICATIONS

Danna et al., "Upward Max Min Fairness," pp. 1-9.
Smith et al., "Yield Management at American Airlines," Transportation-Air, Inventory/Production-Policies, Jan.-Feb. 1992, pp. 8-31.
Elwalid et al., "Routing and Protection in GMPLS Networks: From Shortest Paths to Optimized Designs," Bell Laboratories, Lucent Technologies, Jul. 22-24, 2002, pp. 1-11.
Fortz et al., "Internet Traffic Engineering by Optimizing OSPF Weights," pp. 1-10.
Wang et al., "Internet Traffic Engineering without Full Mesh Overlaying," INFOCOM2001, pp. 1-7.
Roughan et al., "Experience in Measuring Internet Backbone Traffic Variability: Models, Metrics, Measurements and Meaning," AT&T Labs—Research, pp. 1-10.
Gallego et al., "A Multiproduct Dynamic Pricing Problem and Its Applications to Network Yield Management," Operations Research, vol. 45, No. 1, Jan.-Feb. 1997, pp. 24-41.
Roughan et al., "Traffic Engineering with Estimated Traffic Matrices," AT&T Labs—Research, pp. 1-11.
Eriksson et al., "BasisDetect : A Model-based Network Event Detection Framework," IMC'10, Nov. 1-3, 2010, pp. 451-464.
Bertsimas et al., "Revenue Management in a Dynamic Network Environment," Transportation Science, INFORMS, vol. 37, No. 3, Aug. 2003, pp. 257-277.
Crabbe et al., "SDN at Google: Opportunities for WAN Optimization," some slides taken from Urs Hölzle's ONS 2012 keynote, Aug. 1, 2012, slides 1-42.
Song et al., "Optimal Multidimensional Quantization for Pattern Recognition," SPIE, vol. 4875, pp. 15-30.

* cited by examiner

DYNAMIC POLICY ENGINE FOR MULTI-LAYER NETWORK MANAGEMENT

FIELD OF THE DISCLOSURE

The present disclosure relates generally to networking systems and methods. More particularly, the present disclosure relates to systems and methods for a dynamic policy engine for multi-layer network management.

BACKGROUND OF THE DISCLOSURE

A centralized Software Defined Networking (SDN) management plane offers an opportunity to improve current network management practices with automated and optimized management processes. Centralized management is also a key pillar in enabling on-demand usage-based services, which is the direction network deployments are moving towards. A major problem is how to handle real-time automated network management with good performance, given that network management algorithms are complex and may take a much longer time to execute than the network dynamics. A common approach is to use better algorithm design to enable faster performance or to decompose the problem in order to enable parallelism. Both approaches enable more accurate performance for a given computation deadline. That is, conventional approaches in complexity reduction concentrate on speeding up standard algorithms, or making them distributed to enable parallel processing. What these approaches do not realize is that many of the management algorithms can be decomposed along the lines of their complexity. It would be advantageous to improve network management by decomposing real-time algorithms based on their complexity.

BRIEF SUMMARY OF THE DISCLOSURE

In an exemplary embodiment, a dynamic policy method for implementing network management of a network includes pre-calculating management policies for the network, in an off-line manner, based on past observed network load taking into consideration seasonality of network load, forecasts of the network load, and planned events on the network load; selecting a policy from the pre-calculated management policies, to manage the network in an on-line manner, wherein the selecting is either time-based or performance-based; and performing network management functions in the network utilizing the selected policy. The selected policy can be reevaluated over time or based on detecting the network load has changed significantly enough to warrant a policy change. The pre-calculating can be performed before real-time deadlines are needed to be met to perform the network management functions. The selected policy can be maintained using a longest-hold approach where the selected policy is kept for as long as possible to keep network performance acceptable. The management policies can include one of administrative weight policies, routing and wavelength assignment policies, channel assignment policies, dynamic pricing policies, and zone assignment policies. The selecting can be determined using a utility function for the management policies, which is determined through one of a formula, optimization technique, and simulation. The selecting can be first time-based, selecting the selected policy based on a time-based policy look up, and second performance-based, adjusting to a different policy if the selected policy is not acceptable based on the network load. The management policies relate to performing Operations, Administration, Maintenance, and Provisioning (OAM&P) in the network, in an automated manner. The network management functions can be provided through a Software Defined Networking (SDN) management plane.

In another exemplary embodiment, a management system configured to provide dynamic policy management for implementing network management of a network includes a processor; and memory storing instructions that, when executed, cause the processor to pre-calculate management policies for the network, in an off-line manner, based on past observed network load taking into consideration seasonality of network load, forecasts of the network load, and planned events on the network load, select a policy of the pre-calculated management policies, to manage the network in an on-line manner, wherein the selecting is either time-based or performance-based, and perform network management functions in the network utilizing the selected policy. The selected policy can be reevaluated over time or based on detecting the network load has changed significantly enough to warrant a policy change. The off-line manner can be performed before real-time deadlines are needed to be met to perform the network management functions. The selected policy can be maintained using a longest-hold approach where the selected policy is kept for as long as possible to keep network performance acceptable. The management policies can include one of administrative weight policies, routing and wavelength assignment policies, channel assignment policies, dynamic pricing policies, and zone assignment policies. The selecting can be determined using a utility function for the management policies, which is determined through one of a formula, optimization technique, or simulation. The selecting can be first time-based, selecting the selected policy based on a time-based policy look up, and second performance-based, adjusting to a different policy if the selected policy is not acceptable based on the network load. The management policies relate to performing Operations, Administration, Maintenance, and Provisioning (OAM&P) in the network, in an automated manner. The network management functions can be provided through a Software Defined Networking (SDN) management plane.

In a further exemplary embodiment, a network configured to provide dynamic policy management for implementing network management includes a plurality of nodes that are interconnected; and a controller communicatively coupled to the plurality of nodes, wherein the controller is configured to pre-calculate management policies for the network, in an off-line manner, based on past observed network load taking into consideration seasonality of network load, forecasts of the network load, and planned events on the network load, select a policy of the pre-calculated management policies, to manage the network in an on-line manner, wherein the selecting is either time-based or performance-based, and perform network management functions in the network utilizing the selected policy. The controller can be a Software Defined Networking (SDN) controller.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server which may be used to realize an SDN controller, in other systems, or the like;

DETAILED DESCRIPTION OF THE DISCLOSURE

Figure 1:
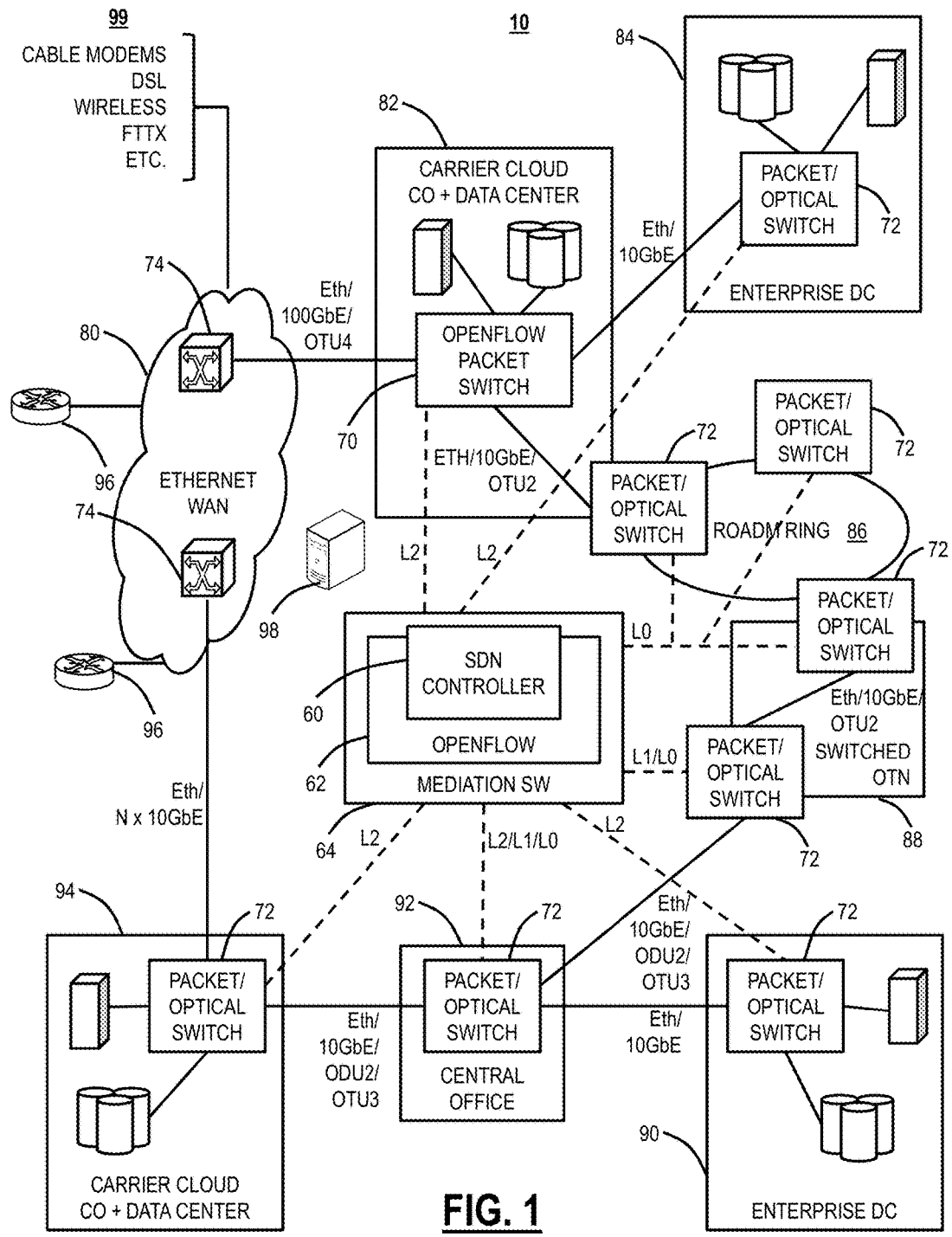
FIG. 1 is a network diagram of an exemplary network.

In various exemplary embodiments, systems and methods for a dynamic policy engine are described for multi-layer network management. The systems and methods split network management functions into an off-line portion and on-line portions to provide optimal or near-optimal network management in real-time. The off-line management functions are run before real-time deadlines need to be met to produce a policy, which can be used at a later time for real-time network management. The on-line management function uses pre-calculated policies, from the off-line management, for real-time management of network resources. A dynamic policy engine creates, manages and applies the policies to meet the network dynamics. The inputs to the dynamic policy engine are the forecast or seasonality of network load, planned network loads, the planned or forecast network upgrades, and the like. That is, the systems and methods work with network load forecasts produced by taking advantage of traffic seasonality or traffic growth patterns, planned traffic, planned network upgrades and forecast network upgrades. The systems and methods can also determine multi-layer policies (e.g., Layers 0, 1, 2, and/or 3).

The dynamic policy engine creates the policies using these inputs and stores them for later use, when network dynamics require it. During real-time operation, the dynamic policy engine manages and applies policies. A policy may be activated based on the time-stamp of the forecast network load, which was used to calculate the policy. To ensure that network policies match the network load, the dynamic policy engine also checks and measures network load against the active policies to ensure that the forecasts were adequate. If the forecast is inadequate the dynamic policy engine may calculate a new policy based on the observed load. The policy may need to be stored if it is not calculated during the time that the network load is active. The dynamic policy engine may also search through the known policies to see if one of them is adequate for the observed load.

For the creation of the policies it is important to comb through all the times where the policy may need to be changed, however it is also advantageous to keep the total number of policies low to prevent too many changes in network management. In particular, two exemplary embodiments are described for determining policies with the forecast inputs. The first exemplary embodiment uses a longest-hold strategy, where a selected policy is kept for as long as possible to keep the network performance acceptable. The second exemplary embodiment uses an optimal strategy, which selects a required number of policies and keeps the acceptability of the policies at a maximum. The systems and methods are versatile and apply to almost any management algorithm that can be decomposed along the lines of complexity; various exemplary embodiments are described to show how this may be done. For example, the dynamic policy engine may be used in terms of dynamic pricing, link weight calculation, optical network reconfiguration, and the like.

A key aspect of the systems and methods is that past network measurements are used to produce a forecast of the network load, which enables the systems and methods to produce policies well in advance of when they are needed. Another aspect of the systems and methods is tracking the network load in real-time to ensure that the policy currently active is appropriate for the currently observed network load. Policies can be matched to a network load based on time-stamps, or based on their utility with respect to the load.

The systems and methods are based on the fact that management problems may have hard-to-compute portion and easy-to-compute portion that can be decomposed along those lines. The output of hard-to-compute portion is a policy, which can be used in easy-to-compute portion for actual network management. For example, traffic engineering (hard-to-compute optimization) can be used to produce optimal link weights, which can be used for path computation (easy-to-compute shortest-path algorithm). Instead of computing both hard-to-compute and easy-to-compute parts of the management optimization in real-time, a better approach to get near-optimal performance may be to determine the optimum policy with hard-to-compute parts of the management optimization before the real-time constraints become necessary and enable the use of the policy in easy-to-compute portion of the management algorithm when real-time constraints are required.

Again, the systems and methods propose a split of management functions into off-line and on-line portions. The off-line management functions are run before real-time deadlines occur and produce a policy, which can be used at a later time for real-time network management. The on-line management function uses pre-calculated policies for real-time management of network resources. Functionally, the dynamic policy engine pre-calculates management policies based on past observed network load, taking into consideration load seasonality, network load forecasts and planned network upgrades. The policies are retrieved as required by network dynamics and applied through online management algorithms. The policies can be stored in a table which can be indexed by time or policy performance. The policies may also be calculated on-demand if a spurious demand is observed and then retrieved later if a similar demand is observed. That is, the approach described herein uses the knowledge of future network load to pre-calculate the difficult to compute part (policy) and then use the easy to compute part in the real-time operation.

Exemplary SDN Network

Referring to FIG. 1, in an exemplary embodiment, a network diagram illustrates an exemplary network 10 for describing the systems and methods. Those of ordinary skill in the art will recognize that any network configuration, such as at Layers 0, 1, 2, and/or 3, is contemplated with the systems and methods, and the network 10 is merely presented for illustration. The network 10 is an SDN network, which includes an SDN controller 60 with the ability to (logically) centrally program provisioning of forwarding in the network 10 in order for more flexible and precise control over network resources to support new services. Application Programmable Interfaces (APIs) provide programmatic communication between the SDN controller 60 and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Speciation, Version 1.1.0 (February 2011)—Version 1.3.0 (June 2012), the contents of which are incorporated by reference herein. While OpenFlow describes one version of an SDN interface, other SDN protocols besides OpenFlow (such as Netflow, REST, etc.) are also contemplated with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—each communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can be traditional Ethernet switches that are not controlled by the SDN controller 60. The network 10 can include various end user access technologies 99, such as, without limitation, cable modems, digital subscriber loop (DSL), wireless, fiber-to-the-X (e.g., home, premises, curb, etc.), and the like.

Generally, SDN opens new mechanisms for network management in the network 10. Specifically, network services are provided through real-time provisioning of on-demand services by a centralized control plane which can be referred to as an SDN management plane. A network service may refer to a connection between clients (e.g., point-to-point Virtual Private Network (VPN) L3 or L2 connection, over OTN or other technologies); a virtual network with multiple point-to-point connections, point-to-multipoint connections, or multipoint-to-multipoint connections between multiple client sites (e.g., data centers, many-to-many business connections); or the like. The network services may be on-demand requiring immediate, deferred or periodic bandwidth. Immediate bandwidth may be required for connections that have real-time requirements (i.e., direct business to business connection such as banks), deferred bandwidth may be for connections that know their future demands (i.e., live television events, planned network migration, etc.), and periodic bandwidth may be for connections that have a periodic bandwidth pattern (i.e., backup between data centers, daily mobile cellular traffic, etc.).

From a terminology perspective, the switches 70, 72, 74 can be referred to as nodes or network elements (the term "node" is used as follows). The network 10 includes a plurality of nodes that are interconnected—the interconnections of the nodes can be a Layers 0 (optical), 1 (TDM), 2 (packet), or the like, as well as a combination thereof. Also, the network 10 (and other networks) contemplate other types of devices for the nodes. As described herein, the nodes are managed/controlled by the SDN controller 60 and/or the NMS 98. As part of providing network management, which is generally known as Operations, Administration, Maintenance, and Provisioning (OAM&P), the nodes are operated accordingly to policies. The systems and methods described herein propose a novel dynamic policy engine which handles policies both in an off-line manner (to computationally determine the policy) and an on-line manner (to operate the nodes in real-time according to a selected policy).

SDN Controller/Management Plane

Figure 2:
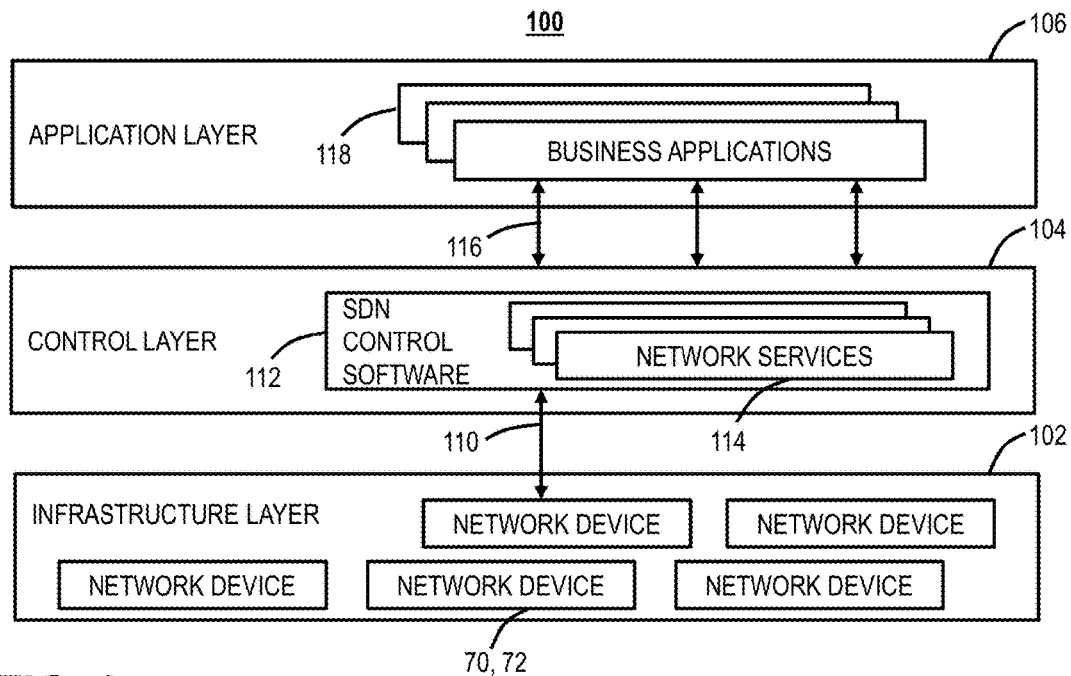
FIG. 2 is a block diagram of functional components of the SDN environment.
Figure 3:
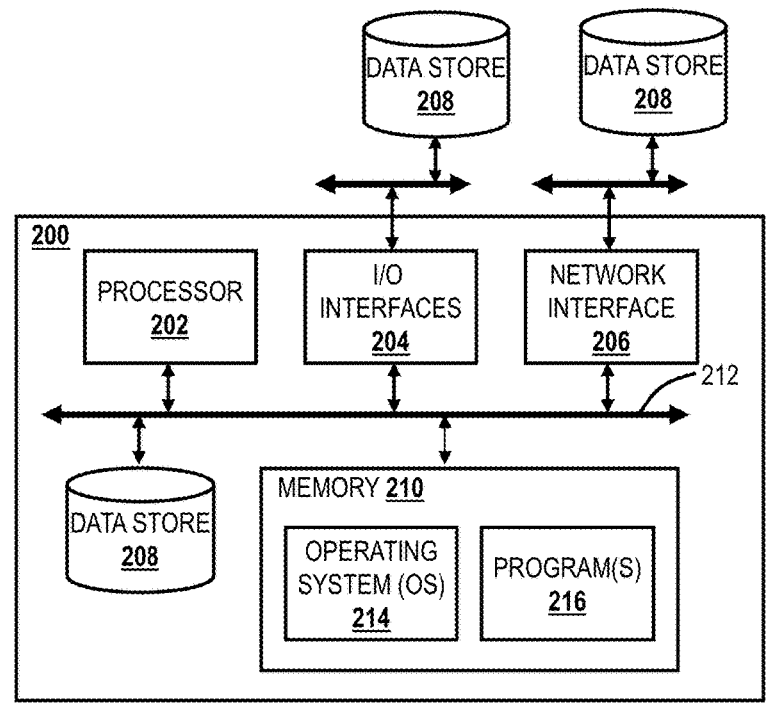

Referring to FIG. 2, in an exemplary embodiment, a block diagram illustrates functional components of the SDN environment 100. The SDN environment 100 includes a programmable infrastructure layer 102, a control layer 104, and an application layer 106. The layers 104, 106 can be implemented on a server or the like such as illustrated in FIG. 3 and the functional components can be implemented in software executed on the server. The programmable infrastructure layer 102 includes network devices such as the switches 70, 72 and is communicatively coupled to the control layer 104 via an interface 110 such as OpenFlow, for example. The control layer 104 facilitates communication between the application layer 106 and the network devices 70, 72 located in programmable infrastructure layer 102. The control layer 104 includes SDN control software 112 with a plurality of network services 114. The control layer 104 provides SDN functionality to manage network services through abstraction of lower level functionality. The application layer 106 communicates to the control layer 104 through various Application Programming Interfaces (APIs) 116. The application layer 106 provides end user connectivity to the SDN environment 100 such as software modules and/or functions responsible for creating desired path and flow connections on the physical network through various business applications 118. In an exemplary embodiment, the systems and methods described herein are implemented as one of the business applications 118 on the SDN controller 60 and/or on a separate server 200.

Referring to FIG. 3, in an exemplary embodiment, a block diagram illustrates a server 200 which may be used to realize the SDN controller 60, in other systems, or the like. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Real-Time Network Management with SDN

With SDN, on-demand network services are expected to allow network service providers opportunities to attract new clients and increase revenues. On-demand services are provided through real-time network configuration and real-time provisioning by a centralized control plane, such as an SDN management plane. Here, resource configuration and allocation can be handled in a centralized manner by the SDN management plane. The SDN management plane reconfigures the network in real-time based on the current network load to increase the number of simultaneous on-demand services, or their revenue. The reconfiguration may occur in multiple layers, each having its own management functions.

Many of the network management functions are implemented with complex and time consuming optimization algorithms. That is, many of the network management problems are large combinatorial problems (e.g. vertex, edge, path coloring) that may require linear or convex programming with large number of variables and constraints, integer programs which require exhaustive search with branch and cut methods, and/or time consuming heuristics such as genetic programming. The size of the problem is also related to the network topology size, however if the multiple networks or layers are combined into a single graph, the size of the problem grows further. Management decisions should happen in real-time; thus, it is not feasible to run a full optimization and obtain the best network configuration on every network change.

In various exemplary embodiments, a timely divide-and-conquer approach is proposed. Optimization problems are split into an off-line portion and on-line portion. The off-line portion uses the knowledge of past network load to estimate future network loads and combines this knowledge with planned upgrades to pre-calculate optimal network policies to be used in future times. The on-line network management portion uses the pre-calculated network policies to manage the network in real-time. To provide this functionality, a policy manager is described herein to keep track of network policies and to apply them in the network as the network load changes.

Exemplary Network Management Functions

Some examples of network management functions can include, without limitation, traffic matrix estimation, admission control, link weight determination for path computation, revenue management, steering of lasers in L0, spectrum rebalancing in L0 etc. Each of these can benefit from the on-line/off-line optimizations described herein. Traffic matrix estimation is generally used to to create inputs for management algorithms, which may include seasonality information, or detect if traffic patterns have changed and to act on that change. Principle Component Analysis (PCA) is one approach for detecting a change in the traffic matrix. PCA approach has the problem of too many false alarms, which can be solved by taking care of the seasonality in the traffic as shown in B. Eriksson, P. Barford, R. Bowden, N. Duffield, J. Sommers, M. Roughan, "BasisDetect: A model-based network event detection framework," IMC'10, pp. 451-464. In terms of real-time operation of management algorithms, the approach seems to be speeding up the complex algorithms as shown in the Danna, E.; Mandal, S.; Singh, A., "A practical algorithm for balancing the max-min fairness and throughput objectives in traffic engineering," INFOCOM, 2012 Proceedings IEEE, vol., no., pp. 846, 854, 25-30 Mar. 2012, but this approach does not scale well. Other aspects of traffic matrix estimations are described in M. Roughan, A. Greenberg, C. Karlmanek, M. Rumsewicz, J. Yates and Y. Zhang, "Experience in Measuring Internet Backbone Traffic Variability: Models, Metrics, Measurement and Meaning," in International Teletraffic Congress, 2003; and M. Roughan, M. Thorup, Y. Zhang, "Traffic engineering with Estimated Traffic Matrices," IMC'03 (/www.cs.utexas.edu/~yzhang/papers/ospf-imc03.ps).

Obtaining link weights from traffic measurements can be done with optimizations. Once the optimization is solved, the solution can be used to come up with an on-line policy that can be implemented with link weights. Rotz et al. and Wang et al. show two different ways to obtain link weights by solving an optimization (see B. Rotz, M. Thorup, "Internet Traffic Engineering by Optimizing OSPF Weights," INFOCOM 2000, pp. 519-528 (eeweb.poly.edu/e1933/papers/fortz00internet.pdf) and Y. Wang. Z. Wang. L. Zhang, "Internet traffic engineering without full mesh overlaying," INFOCOM 2001, pp. 565-571 (gaia.cs.umass.edu/cs653-2006/documents/infocom2001-te.pdf)). The dual solution approach is shown in Wang et al. Elwalid et al. and Suri et al. show how the on-line portion may be obtained from the primal solution of the optimization (see A. Elwalid, D. Mitra, I. Saniee and I. Widjaja, "Routing and Protection in GMPLS Networks: From Shortest Paths to Optimized Designs," Journal of Lightwave Technology, vol. 21, no. 11, pp. 2828-2838, November 2003, 2003. (cm.bell-labs.com/who/mitra/papers/DBR_Journal_062303.pdf) and S. Suri, M. Waldevogel, P. R. Warkhede, "Profile-based routing a new framework for MPLS traffic engineering", Quality of Future Internet Services, pp. 138-157, 2001). Elwalid et al. and Suri et al. assume that they are designing an on-line policy (traffic lanes), based on the estimate of traffic matrices, but do not take advantage of the forecast of the traffic matrix so there is only one policy calculated, which is insufficient for networks where the traffic demands are dynamic in nature.

Revenue management is well researched in airline and rental-car industries. Similar approaches can be applied for dynamic pricing of network services. In many solution approaches, there is an optimization, which is sensitive to the network load, which produces a policy (nesting limits, bid prices, etc.) that can be used for real-time operation. In those industries, demands are well behaved, so a dynamic policy engine was not necessary since there is no automatic monitoring of demand changes. Examples of revenue management are described in B. C. Smith, J. F. Leimkuhler, R. M. Darrow, "Yield Management at American Airlines," Interfaces 22: January-February, 1992, pp. 8-31 (classes.engineering.wustl.edu/2010/fall/ese403/software/Informs%20Articles/CH18%20Yield%20Management%20at%20American%20Airlines.pdf); G. Gallego and G. van Ryzin, "A multiproduct dynamic pricing problem and its application to network yield management," Operations Research, January-February 1997, Vol. 45, No. 1, pp. 24-41 (www8.gsb.columbia.edu/researcharchive/getpub/3942/p); and D. Bertsimas, I. Popescu, "Revenue Management in a Dynamic Network Environment", Transportation Science, Vol. 37, No. 3, August 2003.

Traffic and Infrastructure Predictability Enables Pre-Calculation of Policies

One of the motivations of the systems and methods described herein is that network policies can be pre-calculated for future usage. This requires knowledge of future traffic patterns and infrastructure deployments. The knowledge of the future network load and structure allows pre-calculation of policies in advance for nearly optimal performance, without having to devise real-time optimal algorithms. Future Infrastructure behavior and availability can be well known. That is, equipment rollouts are planned in advance and can be input into management tools manually. The optical layer deteriorates at a predictable rate, meaning that network capacities decrease in a predictable way. Thus, since network infrastructure is known well before any policy needs to be applied, there is time to run off-line portion of management algorithms.

Also, exact changes in future traffic may be known from customer interaction. Network providers may be aware of large network shifts (e.g., iOS update leading to software downloads, data center moves, etc.). Network providers may be aware of short-term future committed bandwidth (e.g., sports events). Further, the SDN management plane may even be involved in scheduling this traffic (e.g., through SDN applications).

Of course, most of the time, future network loads are not always precisely known, but network traffic has some predictable features, which can be leveraged. There may be a well-defined growth curve in the traffic. Historically, network traffic has always gone up (e.g., linear or exponential growth). If all traffic scales up the same way, there may be some policies that may scale with the traffic and do not need updating. However, traffic distribution (i.e., A-Z traffic pattern) may not all grow at the same rate and infrastructure may also change, so policies need to be adapted over time.

There may be seasonality in the traffic (daily, weekly, and monthly). Network traffic follows human activity, generally there is more traffic during the day and during the weekdays than at other times. This pattern is true even for data cloud traffic, which follows human activities during the day and human scheduling during the night (e.g., nightly backups). Seasonal properties of the traffic can be provided by a network analytics engine and can be used to calculate a set of policies to use over the period of seasonality. Thus, general busy periods may be well known even if they may not be easy to predict with statistical tools alone. Busy periods can be input manually by the network operator, or statistical tools can be given input to help them determine busy periods. For example, weekly busy periods may be easily predicted (i.e., weekly back-up or back-office actions). There are also other busy periods during the year (e.g., black Friday shopping, mother's day). The points of busy traffic may be used as an input to calculate off-line portions of the systems and methods described herein.

Network Policies with Off-Line and On-Line Components

As described herein, network policies are used to manage and operate the network, in real-time. Network policies can be any adjustable parameters associated with network operation. Network policies bridge off-line and on-line portions of complex network management processes. The off-line portion may require a time consuming optimization to find the best policy for a given set of network loads and network topology. The output of the off-line portion is the optimal network policy. The on-line portion applies the policy in a time efficient way to run the network at a desired operating point. The key enabler of this approach is that the past network load is a good indication of the future network load, so policies obtained by looking at past network measurements can be used for future network loads.

Some exemplary network policies can include, without limitation, a routing policy for administrative link weights, a routing and wavelength assignment policy, a channel assignment policy, a dynamic pricing policy, a zone assignment policy, and the like. Administrative link weights are used in path computation, i.e., given a set of network demands, there is a way to route them that is optimal from a point of view of a given network utility. It is possible to achieve optimum routing with minimum cost path calculation if optimal administrative link weights are used (obtained from optimization). For the off-line portion, determining the optimum administrative weights is time consuming, since it involves solving an optimization. For the on-line portion, determining the optimum path is not time consuming, since it involves using a shortest path algorithm.

For routing and wavelength assignment policy, there are link weights to combine wavelength link and path costs. Routing and wavelength assignment problem is computationally hard to solve, but heuristics exist which rely on routing with dynamic link weights, which are a reflection of current wavelength usage. Connections are routed and are assigned a wavelength using a weighted link and path cost. Link and path costs are determined from various wavelength assignment metrics, and the metrics measure the cost of assigning a wavelength to a particular connection on a particular link. The weighted sum of these costs can be used for routing purposes. For the off-line portion, finding the optimum weights for a given topology requires a time consuming Monte-Carlo simulation with a genetic algorithm. For the on-line portion, given the weights of various costs, the problem is to find a shortest route with the link costs corresponding to a weighted sum of wavelength metrics, which is computationally easy. An example of the genetic algorithm is described in commonly-assigned U.S. patent application Ser. No. 13/939,071, filed Jul. 10, 2013, and entitled "NETWORK SPECIFIC ROUTING AND WAVELENGTH ASSIGNMENT FOR OPTICAL COMMUNICATIONS NETWORKS," the contents of which are incorporated by reference herein.

For channel assignment policy, transmit power levels and spectrum assignment of wavelengths is required. Power and spectrum should be assigned to enable routing in the upper layers, but for a given power and spectrum assignment routing can be done independently. For the off-line portion, finding the set of optimum power and spectrum assignment for a given network load may be time a consuming optimization. For the on-line portion, once the assignment is known any routing and wavelength assignment technique can be used. For dynamic pricing policy—nesting limits or bid-price policy, answering a quote with requests for network services requires an estimate of the opportunity cost of accepting a connection, which can be found with a global, but time consuming optimization. For the off-line portion, a known demand profile can be used to solve an optimization, which yields nesting limits, or bid prices. For the on-line portion, nesting limits can be used as capacity constraints for different price levels to obtain feasible paths with shortest path algorithms, and bid prices can be used as link weights to calculate dynamic prices with shortest path algorithms.

For zone assignment policy, this includes logically clustering network elements for processing in various network management processes. A policy may be related to how to divide the network into managed zones for the purpose of better management performance. For the off-line portion, a known demand profile can be used to calculate grouping of nodes that have a good level of computation or communication effort required for fast management algorithms. For the on-line portion, this can include partitioning a network graph into zones and distribute management functions across the zones.

SDN Management Plane

Figure 4:
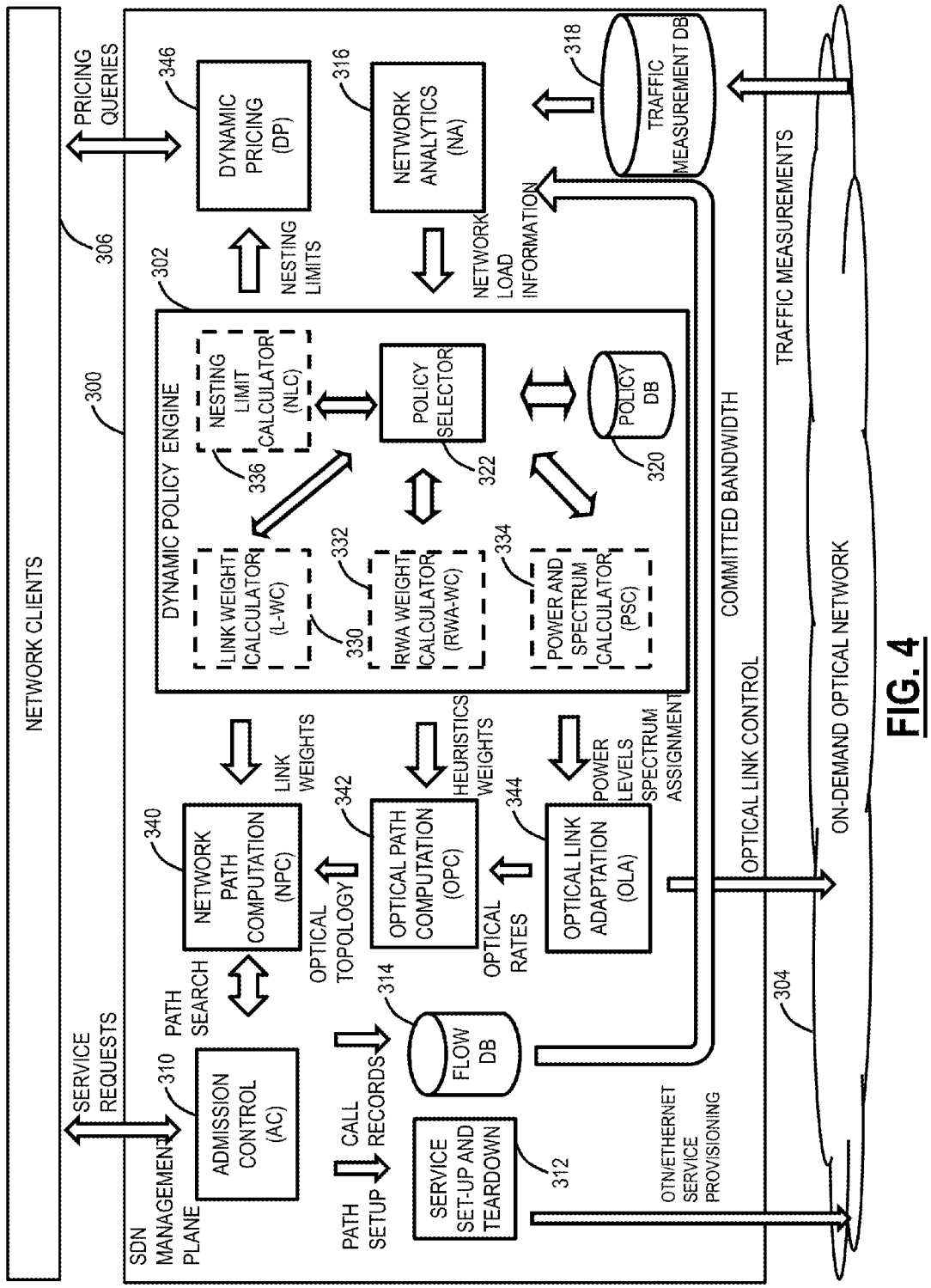
FIG. 4 is a block diagram of an SDN management plane with a dynamic policy engine included therein.

Referring to FIG. 4, in an exemplary embodiment, a block diagram illustrates an SDN management plane 300 with a dynamic policy engine 302 included therein. The SDN management plane 300 is an ecosystem of logical components, which work together to provide on-demand, network resource management between an on-demand optical network 304 and network clients 306. The logical components contemplate implementation in the SDN controller 60, the server 200, etc. The SDN management plane 300 enables on-demand services with real-time negotiation of Service Layer Agreements (SLAs), real-time resource allocation across multiple layers (optical power and spectrum, lightpaths, OTN containers, packet traffic shaping etc.). The SLA negotiation requires the network clients 306 to provide service requests with bandwidth requirements, and the network 304 allocate appropriate resources to meet the SLA. The dynamic policy engine 302 is a logical component that manages the policy selection for one or more management processes. Again, network management processes are split into an off-line portion and an on-line portion. The off-line portion is used by the dynamic policy engine 302 to pre-calculate policies, or calculate policies on demand. The on-line portion participates in the network resource management using a currently active policy, previously determined through the off-line portion.

For illustration purposes, the dynamic policy engine 302 is illustrated with reference to four exemplary processes for the network management processes. These were previously described and include link weight calculation, Routing and Wavelength Assignment (RWA), power and spectrum assignment, and nesting limits for dynamic pricing. Various logical components of the SDN management plane 300 are now described. The SDN management plane 300 can include an admission control (AC) module 310 which negotiates with outside entities, the network clients 306, on behalf of the SDN controller 60 to determine if a connection/network should be accepted or not. For example, the admission control module 310 can interface with the network clients 306 with service requests, provide output to a service set-up and teardown module 312 and associated call records to a flow database 314. The service set-up and teardown module 312 is configured to perform Optical Transport Network (OTN), Ethernet, or the like service provisioning in the optical network 304. While not shown in FIG. 4, the SDN management plane 300 can include a topology database which interacts with various other components. The topology database contains information about link properties: connections between elements, maximum rate between elements. The topology database may contain information about logical links (links that span multiple hops, available OTN containers, etc.) and may contain information about physical links (information about optical spectrum allocation, availability of OTN containers and their type, shared risk link groups, etc.).

The call records can be stored in the flow database 314 which contains information about current and promised bandwidth for traffic A-Z flows, including the promised and current bandwidth on links. The flow database 314 can provide associated information to a network analytics (NA) module 316. A traffic measurement database 318 receives data from the network 304 to collect the current information about the network 304 (e.g., packet counters, allocated bandwidths, traffic patterns, connection behavior, etc.). The traffic measurement database 318 can also provide input to the network analytics module 316. The network analytics module 316 provides traffic statistics regarding the seasonality of traffic, or traffic forecasts used by the dynamic policy engine 302.

The dynamic policy engine 302 is configured to pre-calculate policies based on a forecast of traffic, calculates policies on demand if traffic shifts are detected, and keeps track of available policies in a policy database 320 for multiple management components and activates them at appropriate times. The dynamic policy engine 302 can include a policy selector 322 which interfaces with the policy database 320 for operation based on network load information from the network analytics module 316. The SDN management plane 300 can include off-line modules and on-line modules. The off-line modules may be contained in the dynamic policy engine 302, i.e., logically or physically. Exemplary off-line modules can include a link weight calculator (L-WC) 330, an RWA weight calculator (RWA-WC) 332, a power and spectrum calculator (PSC) 334, and a nesting limits calculator (NLC) 336. The link weight calculator 330 calculates static link weights, such as on a Layer 1 (L1) or Layer 2 (L2) topology for a given demand profile. The RWA weight calculator 332 calculates weights combining RWA heuristics for a given demand profile and available fiber topology. The power and spectrum calculator 334 calculates the assignment of optical powers and spectrum for a given demand profile and available fiber topology. The nesting limits calculator 336 calculates the nesting limits for bandwidth assignment of different classes of service a Layer 1 (L1) or Layer 2 (L2) topology for a given demand profile.

Exemplary on-line modules can include a network path computation (NPC) module 340, an optical path computation (OPC) module 342, an optical link adaptation (OLA) module 344, and a dynamic pricing (DP) module 346. The network path computation module 340 calculates paths on a Layer 1 (L1) or Layer 2 (L2) topology using weights provided by the link weight calculator 330 and information about the dynamic status of links. The optical path computation module 342 calculates a path in an L0 network topology to meet on-demand requests for bandwidth from the Layer 1 (L1) or Layer 2 (L2) topology. The optical link adaptation module 344 calculates modulation and coding levels for active paths in the L0 topology to meet the bandwidth demands from L0 paths. The dynamic pricing module 346 determines the price for a connection to be accepted in the network, and can respond to pricing queries from the network clients 306. Any joint combination of on-line and off-line components is also possible to improve performance, particularly functionality at L0 can be combined into a joint computation of power, spectrum, paths and modulation and coding.

Dynamic Policy Engine

Variously, the dynamic policy engine 302 is configured to assist in managing a network controlled with a centralized management plane, such as the SDN management plane 300, where management functions can be implemented in an off-line portion and an on-line portion. The off-line portion of the management function determines an acceptable, optimal or near-optimal policy, based on traffic forecast and network topology for the forecasted time. The on-line portion of the management function uses the policy during the forecast time to manage the network. The traffic forecast may be based on approximating at least one of the following traits of network load: growth model of the traffic, seasonality of the traffic, and knowledge of planned new traffic, and at least one of the following traits of network topology: planned network upgrades and forecast network topology.

The optimality of the policy is determined using a utility of the policy, which may be determined using a formula, optimization or a simulation. The off-line portion of the management function is calculated prior to the application of the policy. The on-line portion of the management function determines the current policy based on time-based policy table look-up, for example. Alternatively, the on-line portion of the management function determines the current policy based on performance based look-up, where saved policies are searched for the most acceptable policy. The network load is monitored during the forecast time and the on-line portion determines if the policy is acceptable, and, if not acceptable, determines if another saved policy is acceptable, and if no saved policies are acceptable determines a new more acceptable policy and saves it. The acceptability of the policy is determined using the policy utility and a threshold criteria. The policy utility is determined by a deterministic procedure such as a formula or an optimization or by using Monte-Carlo simulation. The acceptability can also be determined using a distance criterion between the forecast traffic matrix and the currently observed traffic matrix and a threshold. A distance between matrices can be obtained by calculating the norm of the difference matrix, for example, or any other suitable method showing similarity between two matrices.

The dynamic policy engine 302 is also configured to determine an on-line policy to use by a network management function at a future time relying on at least a forecast of network load and forecast or knowledge of future network topology. This finds a set of acceptable policies to use over the horizon of the forecast where the number of policies is kept small to prevent the network management churn. An optimal policy is found to use for each forecast time and then collapsed for some of the forecast times to use the same policy in order to decrease policy churn. The network load information is obtained from past network measurements and a predictive function, based on at least one of the following: the long-term properties of the measurements, seasonality of the network measurements. The policies can be collapsed using the longest-hold strategy. The policies are collapsed to minimize the total deviation from the optimal set of policies.

Dynamic Policy Engine Operation

Figure 5:
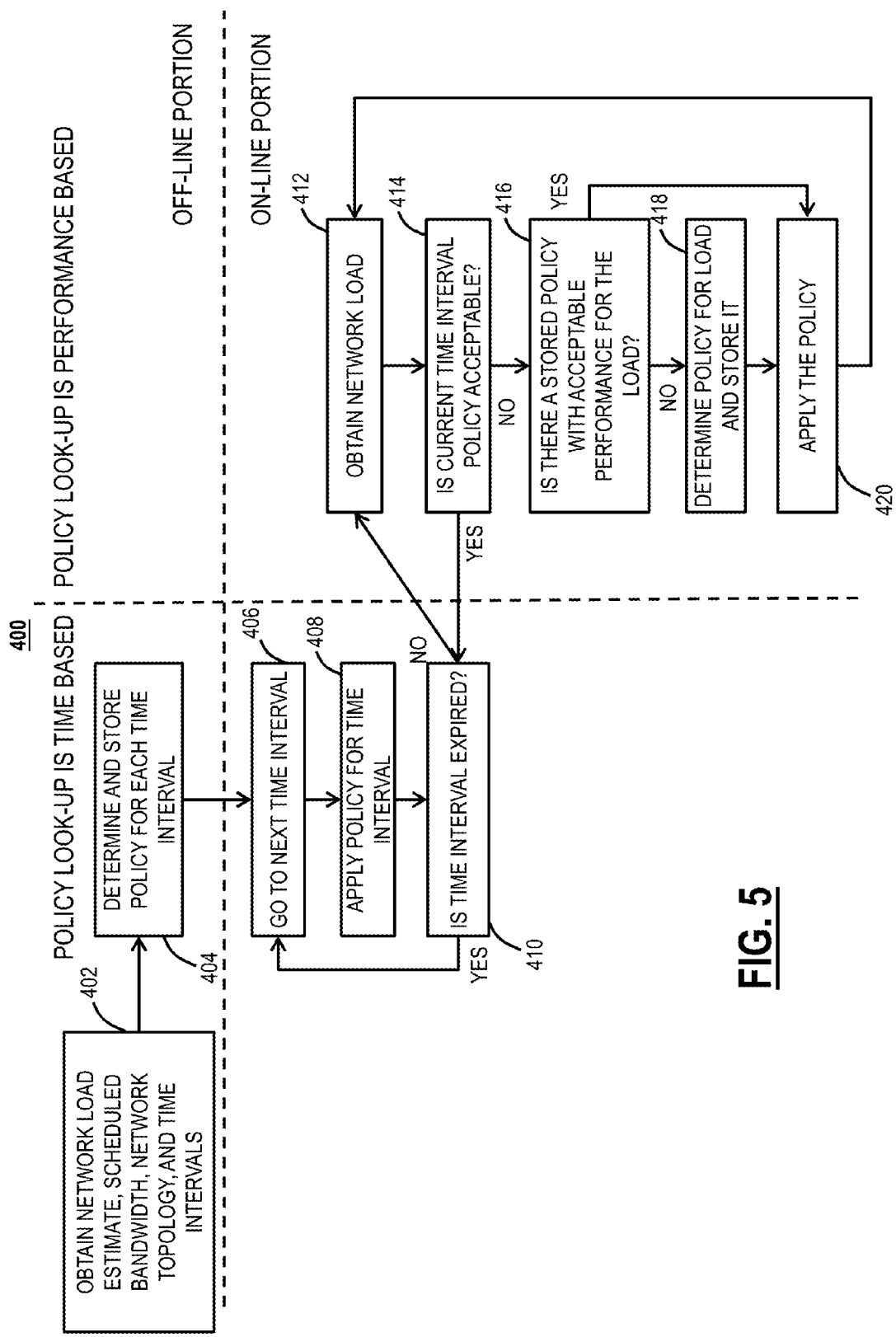
FIG. 5 is a flow chart of a dynamic policy engine process, which can be implemented by the SDN management plane of FIG. 4.

Referring to FIG. 5, in an exemplary embodiment, a flow chart illustrates a dynamic policy engine process 400, which can be implemented by the SDN management plane 300. The dynamic policy engine process 400 includes an off-line portion and an on-line portion, and chosen policies for the on-line portion can be chosen based on time or performance. For the off-line portion, the dynamic policy engine process 400 includes obtaining the network load estimate, including forecasts, scheduled bandwidth, network topology, including planned and forecast network upgrades, and/or time intervals (step 402). The dynamic policy engine process 400 includes determining and storing policy for each time interval (step 404). The policies may be determined using an optimization, or input manually by the network operator. The output of the off-line portion is a plurality of policies that may be used based on time intervals or network performance. Again, the dynamic policy engine process 400 can have time-based policy look-up or performance-based policy look-up. Both cases require a mechanism to determine and evaluate a policy (optimization or evaluation of a policy for the utility function giving the merit for policies' effectiveness). Subsequent exemplary embodiments described herein provide several policies and mechanisms to determine and evaluate them against a network load and topology.

In the on-line portion, for time-based policy, the dynamic policy engine process 400 includes after a current time interval expires, going to a next time interval (step 406), applying an associated policy for the time interval (step 408). The applied policy has now been in use until the time interval ends (step 410) and the dynamic policy engine process 400 returns to the step 406 or until the applied policy is no longer acceptable based on current network performance (steps 412, 414). Specifically, for the current network performance, the dynamic policy engine process 400 includes obtaining the network load (step 412) and checking if the current time interval policy, i.e., the applied policy, is acceptable (step 414). If the current time interval policy is not acceptable (step 414), the dynamic policy engine process 400 includes checking if there is a stored policy, from the off-line policies, that is acceptable based on the current network performance with the network load (step 416). If not, the dynamic policy engine process 400 includes determining a policy based on the network load and storing the determined policy (step 418), and applying the policy (step 420). If there is a stored policy (step 416), the stored policy is applied (step 420).

The step 416 includes a policy mechanism with a quick evaluation of its utility given the network load. For steps 418, 420, it is assumed that an existing policy with good performance is used until a new policy is calculated. The determined policy in the step 418 may not be available until after the network load has already changed, but it can be added to the stored policies for future use.

The time-based policy look-up requires knowledge future traffic through traffic seasonality or traffic growth curve. Traffic seasonality is essentially a forecast of the network load over a period of time, which assumes that the pattern of the network load repeats. The traffic forecast may ignore seasonality of the traffic and uses a predictive function to predict a load over a variable length time duration. It is possible to combine the traffic forecast with traffic seasonality, for example, if some of the A-Zs traffic connections have an increase in bandwidth, while having seasonality features. If traffic seasonality is present, the period of time during which the forecast is valid may be given a longer forecast than what can be predicted without such traffic structure (also the policies may not have to be determined for every period). The performance-based policy is used for unexpected network dynamics which cannot be predicted. This performance based look-up requires a way to evaluate the policy through its utility. It is preferable for the utility evaluation to be a fast operation, since it operates as part of the on-line portion.

Policy Utility and Optimization

Figure 6:
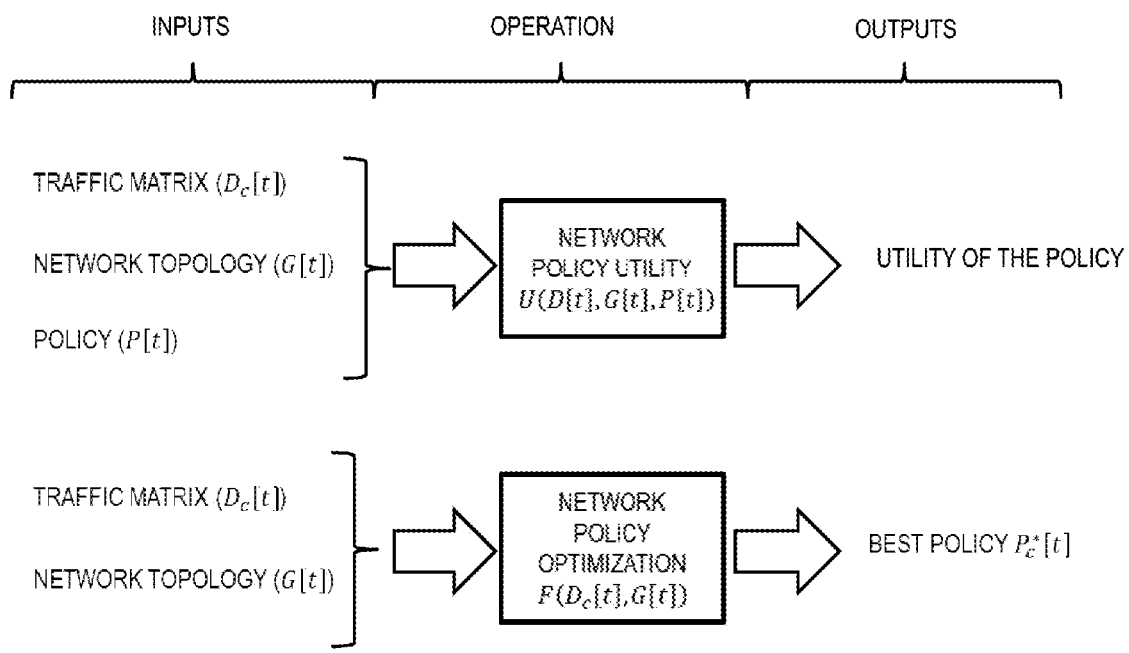
FIG. 6 is a logical diagram of network policy utility and optimization.

Referring to FIG. 6, in an exemplary embodiment, a logical diagram illustrates network policy utility and optimization 450. A policy, P(t), has a utility, U, which indicates its absolute benefit. The input to the utility function are the network load (a traffic matrix), network topology and the policy. The output is a score, which reflects how well the policy works from a network point of view (e.g. total throughput, maximum delay, fairness etc.). This utility can be used to determine "best" policy as a part of an optimization procedure. The utility can also be used to determine if a policy is acceptable for a given traffic load. Some of the exemplary embodiments described herein have a quick way of evaluating a policy using simple addition of traffic on each link. Some of the exemplary embodiments described herein use Monte-Carlo based simulation to evaluate a policy for a statistical range of traffic loads—these approaches may take advantage of massive multi-processing capabilities to obtain good results quickly.

Acceptable performance of a policy is determined with the use of the policy utility. Since the policy is calculated for a given traffic load and network topology, its utility is paired to the load and the topology. Another load or topology will cause the value of the utility for the policy to change, the policy can be considered acceptable for a different load if for the new load its utility is close to the old utility. Another way to define the acceptable performance is to compare the utility of a policy which is optimal for a load and topology with a policy which may not be optimal for a load and a topology if the difference between the two is too large the non-paired policy is not acceptable. This definition is used later combined with the fact that most traffic changes are smooth in terms of the utility. It may be advantageous to decrease the number of saved policies. If a number of policies is very large the performance-based look-up may take too long. Also the network operator may not prefer having to cycle through too many policies. Exemplary embodiments described provide techniques that decrease the number of policies while still having acceptable performance.

Assume that a set of distinct times intervals are provided, where the policy setting should be verified or changed, such as times where the load significantly changes, times where infrastructure changes, etc. These times are denoted with t or $t_k$. Note that a "significant change" may mean that only one component of the network load changed, or that only one link the topology was changed.

The network operation can be defined as follows. Network status is a combination of network load and network topology, $D_c[t]$—network load (demand) at time for class of service c, and $G[t]$—network topology (graph) at time t. Network policy is a set of rules that when they are changed the network behaves in a different way, $P[t]$—a policy, which is active, at time t. Network utility is some network value that can be measured or estimated and depends on demands, topology and policy, $U(D[t], G[t], P[t])$—the network utility for network load $D[t]$, topology $G[t]$, and policy $P[t]$ at time t.

A network policy is optimal if no other policy results in a higher utility—$P_c^*[t]$ is the optimal policy at time for traffic class, network layer, or subset of network layers, c. An optimal policy may be a function of network topology and network load, $P_c^*[t]=F(D_c[t], G[t])$. It is assumed that optimal policy may not be easy (or quick) to calculate. Due to the time-based divide-and-conquer approach, it is inevitable that policies will become out of date. It is then expected if a policy is out of date by $\tau$ seconds at time $U(D_c[t], G[t], P_c^*[t-\tau]) \leq U(D_c[t-\tau], G[t-\tau], P_c^*[t-\tau])$. However, this may still be acceptable if the error is below a threshold which can be an input to the algorithms.

Determining if a Policy is Acceptable

There may be utility-based mechanism to determine acceptability of a policy or a utility-oblivious ways to check the acceptability of a policy. For utility-based mechanisms to determine the acceptability of a policy use the utility function $U(D[t_k], G[t_k], P[t_k])$, assume that an easy way of evaluating the utility of a policy exists and that it takes significantly less time than finding the optimal policy. A threshold mechanism can be used to check if the optimal policy at time $t_i$, $P^*[t_i]$, is acceptable with the traffic matrix at time $t_k$ by comparing with optimal policy at the time $t_k$, i.e., a policy is acceptable if $\|U(D[t_k], G[t_k], P^*[t_i])-U(D[t_k], G[t_k], P^*[t_i])\|<\epsilon$. A threshold policy can also be used to check if a policy, which is optimal at time $t_k$ is acceptable at time $t_i$, i.e., a policy is acceptable if $\|U(D[t_k], G[t_k], P^*[t_k])-U(D[t_i], G[t_i], P^*[t_k])\|<\epsilon$. The first approach assumes that the optimal policy is known for both times, $t_i$ and $t_k$, while the second approach assumes that the utility function has a smoothness in terms of network load and network topology, so that the "best" policy at time $t_k$ is acceptable in a range of times $t_i$, even if the network topology or load are different at those times.

Utility-oblivious ways check if a policy is acceptable without using a utility function for the policy. If the graph is the same, check the similarity between matrices by finding a distance metric for two traffic matrices, policy $P^*[t_k]$ acceptable in time $P^*[t_i]$ if $\|D[t_k]-D[t_i]\|<\epsilon$. There may be many approaches to find the distance between matrices, Element-wise $L_1$, $L_2$, $L_\infty$ norms, Multi-dimensional quantization (see M. Song, R. M. Haralick, "Optimal Multidimensional Quantization for Pattern Recognition," Second International Conference on Image and Graphics, pp. 15-30, 2002 (www.cs.nmsu.edu/~joemsong/publications/Song-Haralick-ICIG2002.pdf). The same can be done for the network graph converted to an adjacency matrix or an incidence matrix.

Network Analytics Engine for Dynamic Policy Selection

The network analytics module 316 approximates and forecasts a future network load, which can be used to determine future policies so that when the future network load is active the policy calculation is already done. There are also other real-time policy calculation mechanisms described herein. The network analytics module 316 determines statistical network load, which is the representative bandwidth of the demands in the network. The network load at a given time is input for management algorithms. The network load may have a trend, which can be used to forecast future network loads and set policies accordingly. The network load may have a seasonality, which means that some network loads repeat with a roughly the same period. A sampled traffic demand matrix can be estimated connection-level call records, by estimating each A-Z demand (pull individual demands into the matrix). The sampled traffic demand matrix can also be estimated link measurements and the knowledge of the routing matrix (divide link measurement matrix with the routing matrix). A weighted running average of the sample traffic matrix can be used to obtain stable estimates.

If the network load can be forecast, some parameters of management algorithms can be pre-calculated well in advance of when the load or the network infrastructure changes. This requires an estimate of the future traffic matrix, and past sample traffic matrices can be used to retrieve and forecast each A-Z load to create a forecast traffic matrix. If seasonality is known, some parameters of management algorithms can be pre-calculated and can be used as a policy during the seasonality period. The network analytics module 316 runs statistical algorithms on network measurements to estimate constituent components of the network load, such as for seasonality period, common seasonality time, seasonal traffic matrix, etc. The seasonality period and common seasonality time estimation can include past sample traffic matrices used to retrieve each A-Z, seasonality of each A-Z flow estimated with spectral estimation techniques. seasonality period as the slowest harmonic among all A-Z flow harmonics, and the common seasonality time as the fastest harmonic among all A-Z harmonics (cut-off frequency of the total spectrum). The seasonal traffic matrix can be estimated from the sample traffic matrix. The seasonal traffic matrix is obtained from the sampled traffic matrix using a periodic sample at common seasonality times over the seasonality period. If the sampling estimation interval is smaller than the common seasonality time, average over the common seasonality time may be used. The seasonal matrix estimate can be combined with known future traffic to determine policies before a seasonality period begins.

Figure 7:
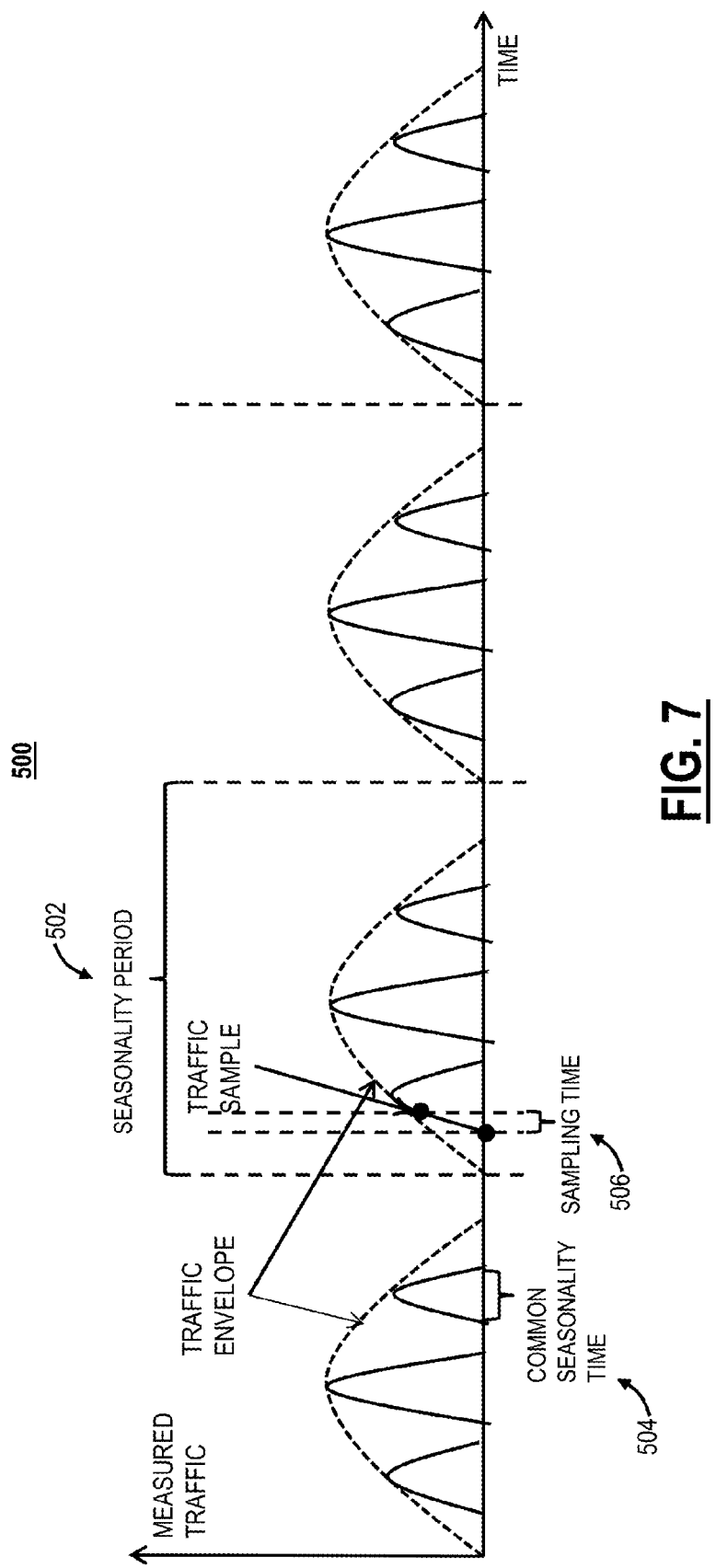
FIG. 7 is a graph of an example of statistical seasonality.

Referring to FIG. 7, in an exemplary embodiment, a graph 500 illustrates an example of statistical seasonality. The graph 500 shows measured traffic (y-axis) versus time (x-axis). A seasonality period 502 is the longest time at which a traffic pattern repeats. A common seasonality time 504 is the longest time at which sampling the seasonality period 502 does not result in aliasing of the frequency spectrum. A sampling time 506 is the time at which the traffic measurements are sampled and may be determined by hardware limitations (e.g. every 15 minutes).

Timing of Network Policy Actions with Seasonal Traffic

Figure 8:
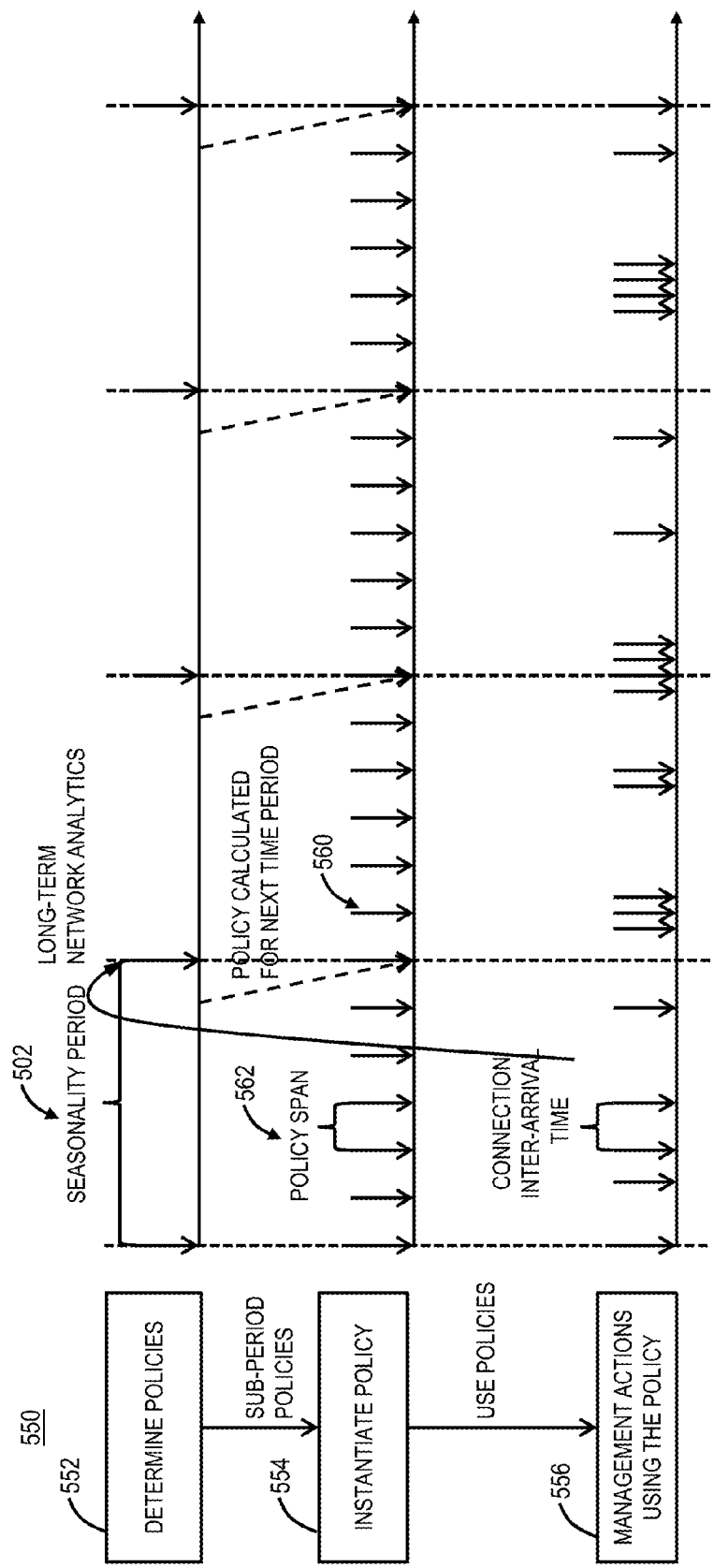
FIG. 8 is a flow chart of a policy instantiation process next to a graph of applied policies.

Referring to FIG. 8, in an exemplary embodiment, a flow chart illustrates a policy instantiation process 550 next to a graph of applied policies. The policy instantiation process 550 includes determining policies (step 552), instantiating the determined policy (step 554), and performing management actions using the policy (step 556). The dynamic policy engine 302 can take advantage of traffic seasonality to pre-calculate the policy over the period of seasonality. The seasonality period 502 can be chosen so that from one period to the next the pre-calculated policies do not change. For example, this is the case if the network load in the previous period is similar to the network load in the next period at the same time points. The seasonality period may be chosen to cover the repeating pattern in the observed traffic (days, weeks, months).

The policies are determined before the seasonality period 502 begins and are held constant during the period. Note, as shown in the graph, there may be several policies specified in different parts of the period and they may span different lengths of time (each policy is specified by reference number 560. During the seasonality period 502, network statistics are collected and refined policies are determined for the next period. Known traffic during the next period is also taken into consideration when policies are determined. A policy span 562 is chosen so that policies are not changed too often; the policy span 562 is the time between policy changes. The policy span 562 should not be longer than the validity of the policy (determined by the dynamic policy module 302). The policy span 562 should not be shorter than the acceptable policy change time (specified by the network operator).

Figure 9:
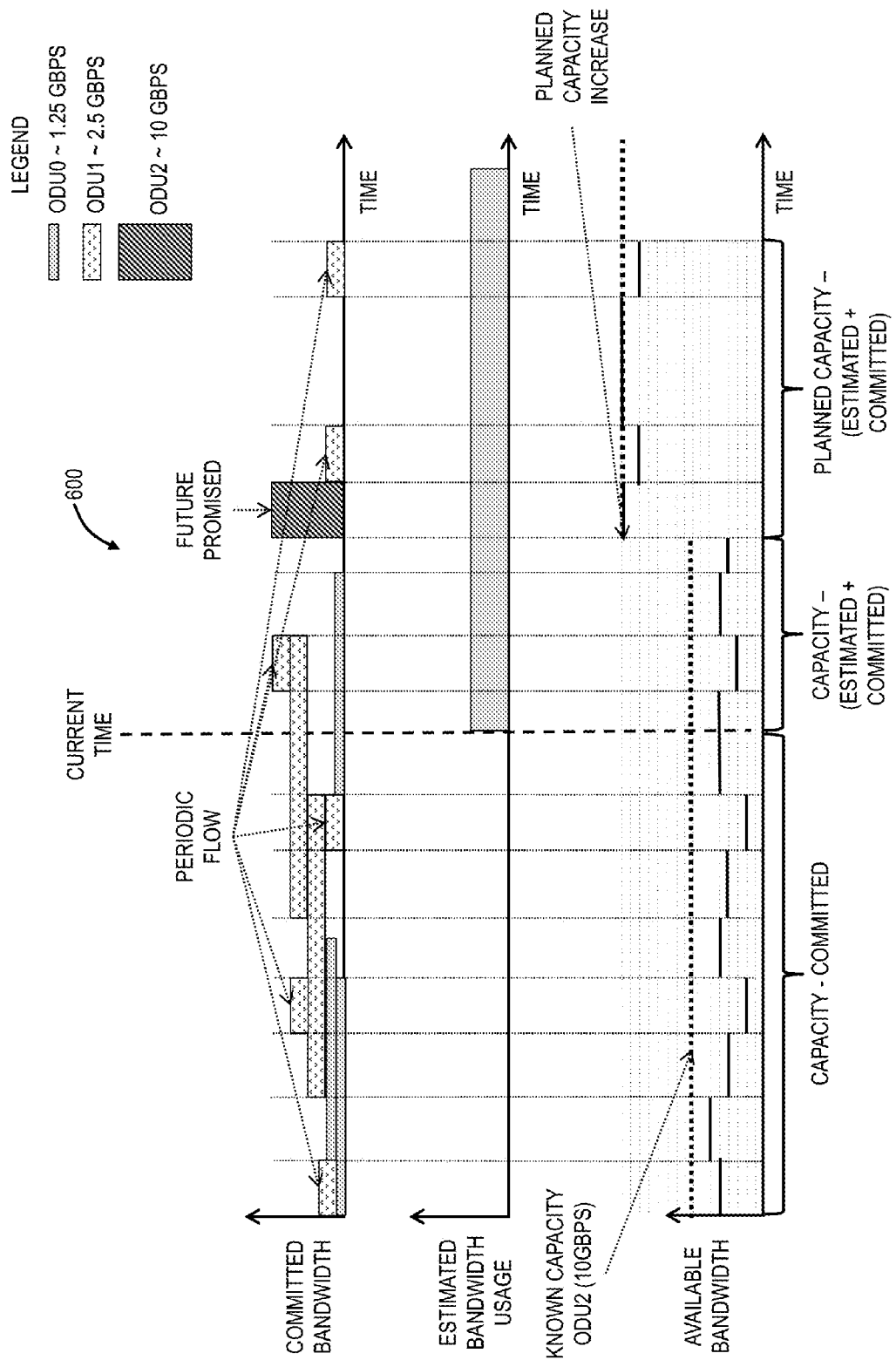
FIG. 9 is a graph of exemplary link bandwidth over time for illustration of the available bandwidth link weight adjustment for a link.

Referring to FIG. 9, in an exemplary embodiment, a graph illustrates exemplary link bandwidth 600 over time for illustration of determining future network loads. The graph includes three graphs—committed bandwidth, estimated bandwidth usage, and available bandwidth, and is shown with a current time with times before the current time having occurred and time after the current time as future expectations. The committed bandwidth shows bandwidth provisioned currently and in the past as well as future provisioned bandwidth. From the committed bandwidth, in the past, the estimated bandwidth usage can be derived for the future, such as based on analysis of previous behaviors. The available bandwidth link weight adjustment can provide adjustments to the link weight based on the available bandwidth graph which can take into account the estimated bandwidth usage plus any future promised bandwidth for the committed bandwidth.

Longest-Hold Network Policy Assignment

Figure 10:
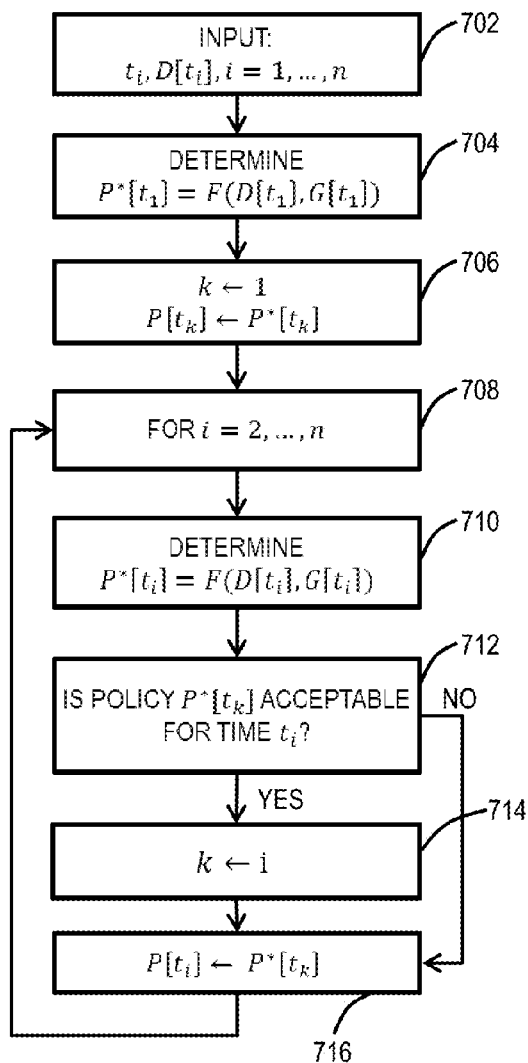
FIG. 10 is a flow chart of a process for a longest-hold network policy assignment.

Referring to FIG. 10, in an exemplary embodiment, a flow chart illustrates a process 700 for a longest-hold network policy assignment. Inputs to the process 700 are times for which the policy can potentially be changed (these times may reflect seasonality of network loads, or fidelity of the network load forecasts), the number of network load samples n, and load for each sample $D[t_i]$ and network topology graph for each sample $G[t_i]$ (step 702). For seasonal traffic $t_i=i\Delta$, $i=1, \ldots, n$, where $\Delta$ is the common seasonality time, and for forecast traffic $t_i$ may be the times when upgrades are planned, or when a large bandwidth request comes online. The process 700 tries to minimize the number of policies in use by saving only the policies which have a significantly better performance than the old policy still in use. The old policy is $P^*[t_k]$, calculated for previous time $t_k$, the new policy is $P^*[t_i]$, calculated for previous time $t_i$, the distance between the policies is calculated using the utility of each policy, and threshold $\epsilon$ is provided by the network operator. The process 700 includes determining the utility of $P^*[t_k]$, i.e. $P^*[t_i]=F(D[t_1], G[t_1])$ (step 704). The process 700 includes setting $P^*[t_1]=P^*[t_k]$, and k=1 (step 706), and for i=2 to n (step 708), the process 700 includes determining. $P^*[t_i]=F(D[t_i], G[t_i])$ (step 710), checking if the policy $P^*[t_i]$ is acceptable for time $t_i$ (step 712), and if so, k is set to i (step 714), and if not or after the step 714, $P[t_i] \leftarrow P^*[t_k]$ (step 716). The optimal policy is determined by solving an optimization problem, which may be time consuming as described herein. Also, the acceptability of the policy can be checked in multiple ways as described herein. A final step which is not shown may be to remove duplicate policies from the time indexed array $P[t_i]$. Each time the process 700 is run, a maximum of n/2 policies are collapsed. The process 700 can be re-run multiple times to obtain the number of desired policies. If the process 700 is run multiple times, it makes sense to store policies, which means that step 710 could be an optimization or a time-based lookup.

Illustration of Longest-Hold Network Policy Selection for Seasonal Traffic Load

Figure 11:
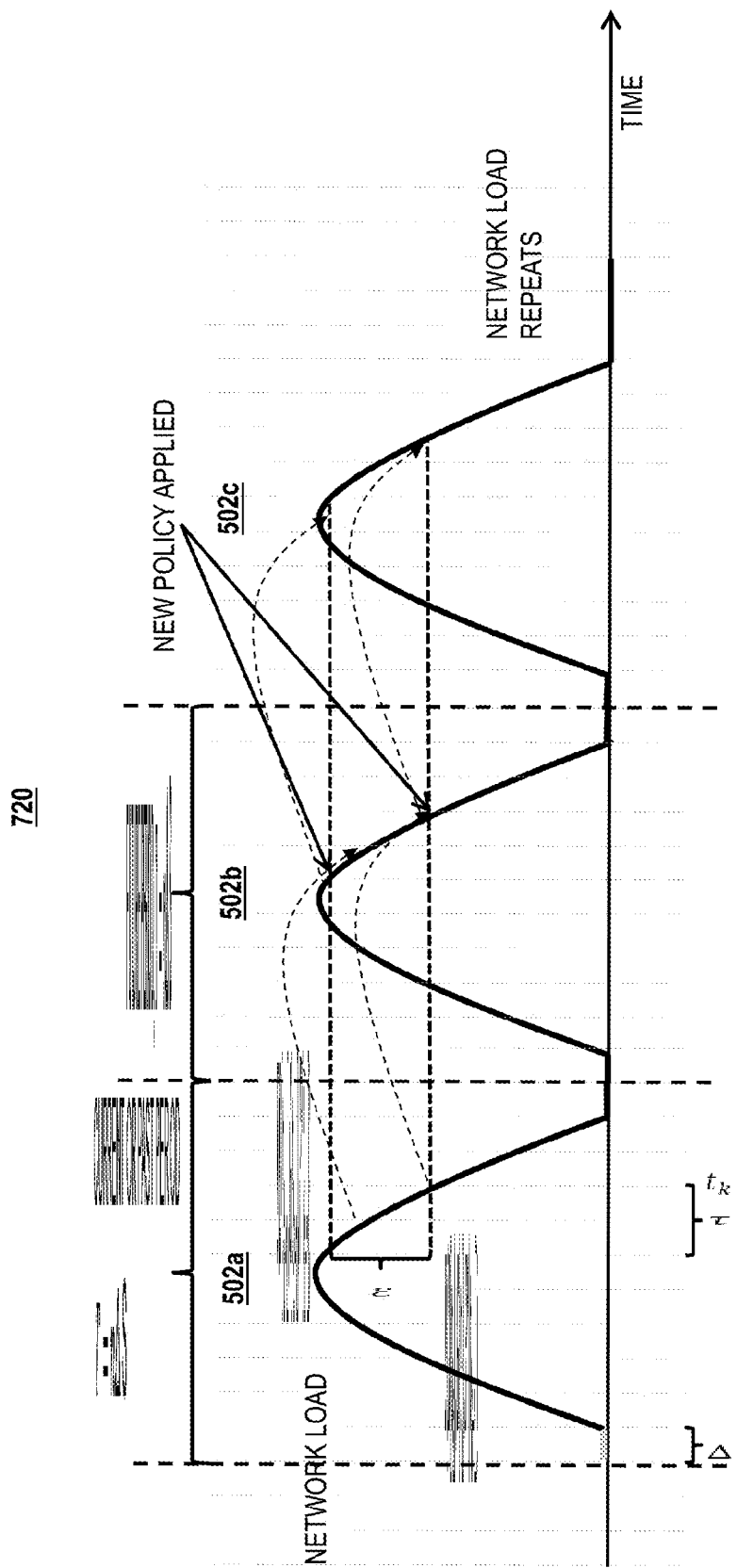
FIG. 11 is a graph of an example of longest-hold network policy selection for seasonal traffic load.

Referring to FIG. 11, in an exemplary embodiment, a graph 720 illustrates an example of longest-hold network policy selection for seasonal traffic load. The graph 720 is network utility for a given load versus time, with different seasonality periods 502. Policies are determined in the past period 502a for the next or some future period 502b, 502c. A one dimensional load is shown for simplicity, the traffic load has the period $T=n\Delta$. Traffic matrix estimates are available at times $t_k=k\Delta$. The steps 710 and 712 can be mapped into a scanning of the time with the changing parameter $\tau$, which is increased until the thresholds is crossed on the utility (vertical) axis. It is assumed that they traffic load repeats in the future. For each traffic matrix the optimum policy is determined, but it may be collapsed into an earlier policy if it is acceptable.

Illustration of Greedy Network Policy Selection for Forecast Traffic Load

Figure 12:
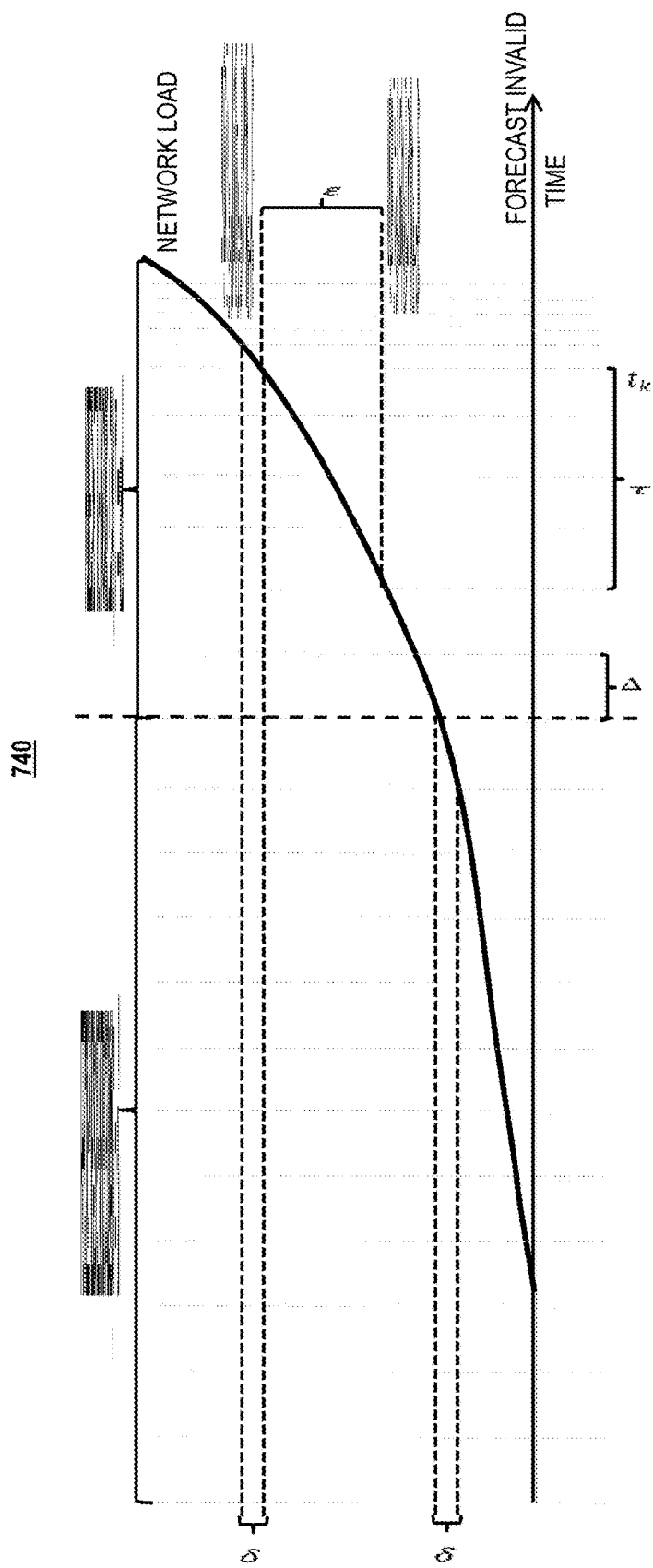
FIG. 12 is a flow chart of a process for finding the most acceptable policy set.

Referring to FIG. 12, in an exemplary embodiment, a graph 740 illustrates an example of the longest-hold network policy selection for forecast traffic load, without seasonality. Policies are determined before the forecast network load starts. A one dimensional load is shown for simplicity, the traffic load forecast has the horizon T. The traffic matrix forecasts are available at times $t_k$. Time may be chosen to be uniform $t_k=k\Delta$ or times may correspond to changes in network load, e.g. times may become shorter if the load increases at a higher rate (e.g. by picking $\delta$ as the difference in the change of load and keep the times such that the change is always constant). The steps 710 and 712 can be mapped into a scanning of the time with the changing parameter $\tau$, which is increased until the threshold $\epsilon$ is crossed on the utility (vertical) axis. Times may correspond to network upgrade times or new customers come online.

Finding the Most Acceptable Policy Set

Figure 13:
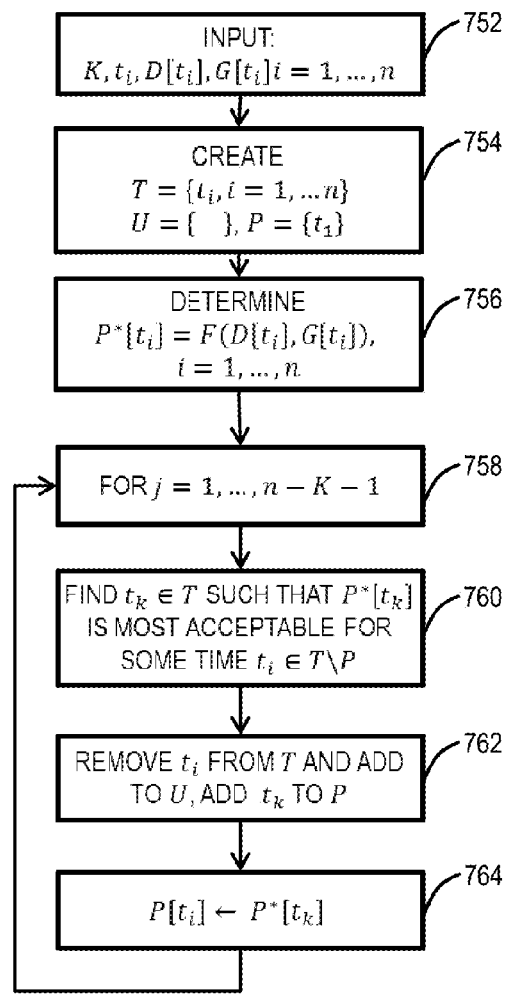
FIG. 13 is a flow chart of a process for finding the most acceptable policy set.

Referring to FIG. 13, in an exemplary embodiment, a flow chart illustrates a process 760 for finding the most acceptable policy set. The process 760 shows how to choose K policies, which minimize the total sum of differences between the optimal policies for the input times and the subset of selected policies. Inputs to the process 760 are the number of policies K to generate over the period of the seasonality or the time-horizon of the network load forecast, the number of network load samples n, and load for each sample $D[t_i]$ and graph for each sample $G[t_i]$ (step 762). For seasonal traffic $t_i=i\Delta$, $i=1, \ldots, n$, where $\Delta$ is the common seasonality time, and, for forecast traffic $t_i$ may be the times when upgrades are planned, or when a large bandwidth request comes online. The process 760 tries to minimize the amount of deviation produced by the set of allowed K policies over the time period.

The process 760 includes creating $T=\{t_i, i=1, \ldots n\}$ and $U=\{\}$, $P=\{t_1\}$ (step 754) and determining $P^*[t_i]=F(D[t_i], G[t_i])$, $i=1, \ldots, n$ (step 756). The process 760 then includes j iterations up to n−K−1 (step 758). In each iteration a policy is selected to span beyond its time period (steps 760, 762, 764). The search for this policy requires that times in $t_k \epsilon T$ be examined as potential candidates to extend a policy from its best time $t_k$ to the next time $t_i$. If the times in T are sorted then for each $t_k$ only the next time is examined ($t_i$ is the smallest time in T\P greater than $t_k$). Since the time $t_i$ is collapsed into time $t_k$, times already in P which are to be collapsible are not examined. T\P is the set of all $t_i \in T$ which are not in P. The acceptability of the policy can be checked in multiple ways as described herein.

Administrative Weights Policy Example

Figure 14:
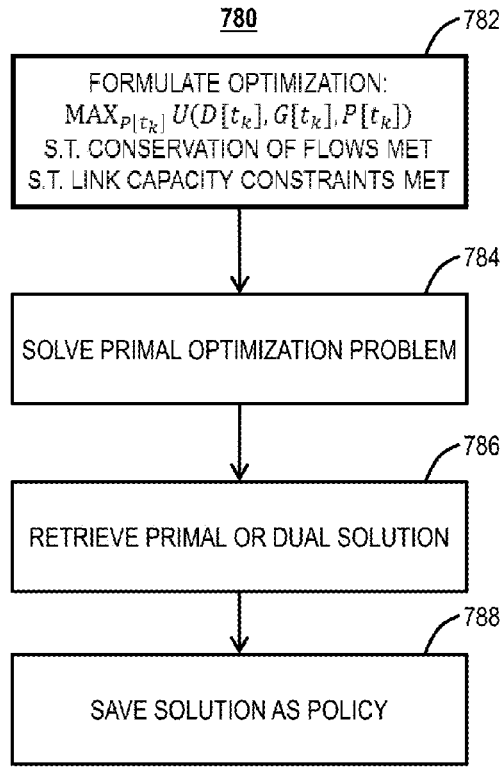
FIG. 14 is a flow chart of a process for an administrative weights policy example.

Referring to FIG. 14, in an exemplary embodiment, a flow chart illustrates a process 780 for an administrative weights policy example. The process 780 includes formulating an traffic engineering optimization (step 782)—$MAX_{P[t_k]}U(D[t_k], G[t_k], P[t_k])$, which finds the optimal network policy for which the conservation of flows met and the link capacity constraints met, solving a primal optimization problem (step 784), retrieving the primal or dual solution (step 786), and saving or returning the solution as a policy (step 788). The optimization problem finds the policy with the maximum utility. The optimization is a linear or convex multi-commodity flow optimization (see Danna, E.; Mandal, S.; Singh, A., "A practical algorithm for balancing the max-min fairness and throughput objectives in traffic engineering," INFOCOM, 2012 Proceedings IEEE, vol., no., pp. 846, 854, 25-30 Mar. 2012). The policy determined by the optimization is a set of link allocations for each demand, or equivalently a set of link weights which can be obtained from the dual of the optimization. The optimization should satisfy conservation of flow constraints for each demand (commodity). The optimization should satisfy link capacity constraints for all demands traversing the link. The utility can be any convex function of demands or bandwidth allocated on links, which is selected by the network operator. The solution of the optimization presents a policy. The link allocations for demands can be used as in profile-based routing (see A. Elwalid, D. Mitra, I. Saniee and I. Widjaja, "Routing and Protection in GMPLS Networks: From Shortest Paths to Optimized Designs," Journal of Lightwave Technology, vol. 21, no. 11, pp. 2828-2838, November 2003, 2003. (cm.bell-labs.com/who/mitra/papers/DBR_Journal_062303.pdf). The dual solution of the optimization gives the link weights, which are the dual variables corresponding to the for link capacity constraints.

Routing and Wavelength Assignment

Figure 15:
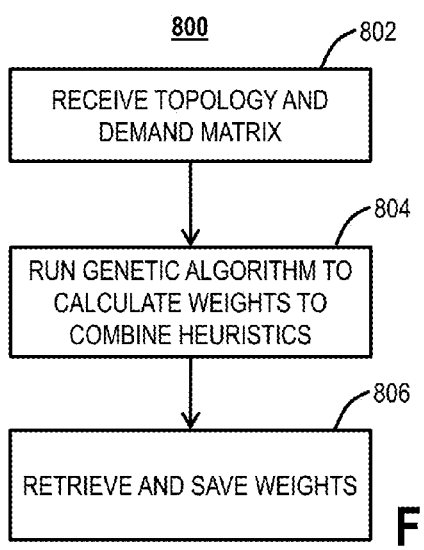
FIG. 15 is a flow chart of a process with Routing and Wavelength Assignment (RWA) for a policy.

Referring to FIG. 15, in an exemplary embodiment, a flow chart illustrates a process 800, which obtains the best RWA policy. The process 800 includes receiving a topology and demand matrix (step 802), running a genetic algorithm to calculate link weights to combine heuristics (step 804), and retrieving and saving the link weights (step 806). The process 800 finds a "best policy", which is the weighing of the heuristics to use when doing joint routing and assignment of weights. The process 800 uses a genetic algorithm to find the weights. In each step of the genetic algorithm, the current set of weights is evaluated to see if it is better than previous weights. After the step is performed the weights are perturbed to arrive at a new offspring in the algorithm and it is evaluated. The output of the process 800 is the best discovered weights. The utility of a policy can be obtained with the same Monte-Carlo algorithm used to calculate the best weights. Again, the process 800 is further described in commonly-assigned U.S. patent application Ser. No. 13/939,071, filed Jul. 10, 2013, and entitled "NETWORK SPECIFIC ROUTING AND WAVELENGTH ASSIGNMENT FOR OPTICAL COMMUNICATIONS NETWORKS," the contents of which are incorporated by reference herein.

Dynamic Pricing Policy Example

Figure 16:
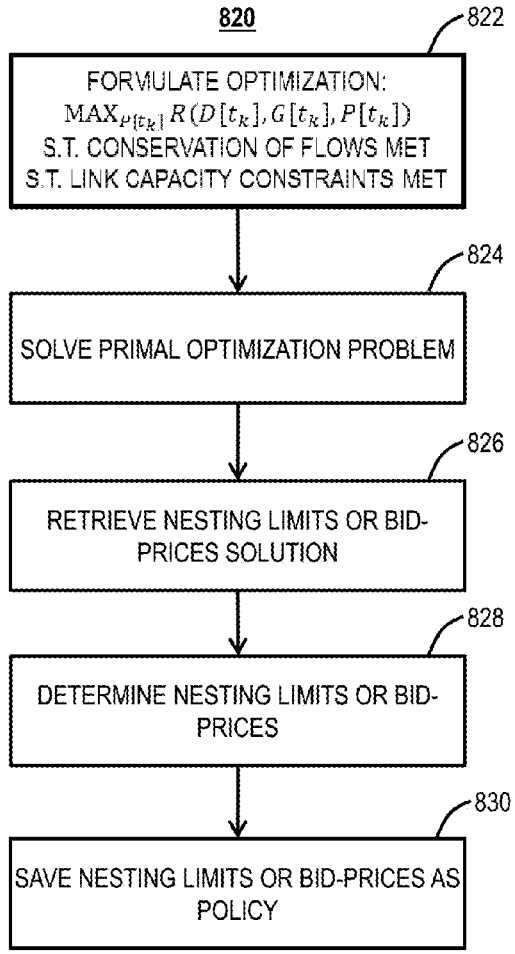
FIG. 16 is a flow chart of a process for a dynamic pricing policy example.

Referring to FIG. 16, in an exemplary embodiment, a flow chart illustrates a process 820 for a dynamic pricing policy example. The process 820 includes formulating an optimization (step 822)—$MAX_{P[t_k]}R(D[t_k], G[t_k], P[t_k])$, which maximizes revenue by calculating expected demands and allocating their load in the network so that conservation of flows is met and the link capacity constraints are met, solving a primal optimization problem (step 824), retrieving the nesting limits or bid-prices (step 828), determining the nesting limits or bid-prices (step 828), and saving the nesting limits or bid-prices as a policy (step 830). The optimization problem finds the policy with the maximum utility. For the purposes of dynamic pricing, the utilization may be the sum of total expected revenue for the expected network load (demands), or sum of total expected revenue taking into consideration the price elasticity of the expected demands. The optimization is a linear or convex multi-commodity flow optimization maximizing expected revenue (see D. Bertsimas, I. Popescu, "Revenue Management in a Dynamic Network Environment", Transportation Science, Vol. 37, No. 3, August 2003). The optimization should satisfy conservation of flows constraints for each demand (commodity). The optimization should satisfy link capacity constraints for all demands traversing the link.

The utility is the expected revenue that can be obtained with the policy. If the optimization uses expected demands, the value of the objective can be the utility. Another way to calculate the policy with steps 822 and 824 is to replace the expected network demands with their distribution and to perform repeated Monte-Carlo optimizations with demands following the distribution of the demands to find the expected revenue of the policy (see Bertsimas et al. above). The solution of the optimization can be used to determine a policy. The primal solution of the optimization can be used to determine nesting limits on each link. The dual solution of the optimization can be used to obtain bid-prices.

Revenue Management with Dynamic Pricing

Revenue management exploits multiple dimensions along which pricing can be designed to influence how products are sold. In the context of the systems and methods described herein, the products are bandwidth. The dimensions can include a time dimension: when the product is sold; a product dimension: which products are sold; customers: influence customer behavior to buy more or less of the product; etc. For example, at a fixed point in time, one may limit the supply of a product type to sell a higher-priced product to a higher paying customers. At a fixed time and for a fixed product, one may optimize the price to maximize the revenue of each customer or region (price discrimination). Over a period of time in time, one may lower or increase a price of a product to influence it customers to buy more or less of it and keep the product-mix constant. Revenue management tools are used to increase revenue by controlling quantity of product sold, or the price at which it is sold, and when it is sold.

For example, quantity-based revenue management (product differentiation) can be used in example industries such as airlines, rental cars, hotels. Appropriate when there is production inflexibility—not easy to ramp-down production. There are multiple products offered at different prices. The prices are assumed to be fixed for a time horizon. The prices may be different over sub-periods before the time horizon. Prices may be advertised, or bound contractually before the time horizon. Depending on the demand at a given time, revenue management is used to find limits on the supply of each product type to maximize revenues. Revenues increase in multiple ways such as the number of customers wanting a higher end product may be limited, which required the introduction of lower end products ensure capacity is filled; a number of lower priced products is limited to prevent cutting into higher end products; when the supply is limited, some customers may purchase higher-end products leading to upselling; etc.

A price-based revenue management (price discrimination), such as in retail, is appropriate when the supply is inflexible. It may be hard to increase supply of the product, or reduce supply of the current product. It may be hard to move product to meet shifting demands. The price of the product may be lowered to sell of the existing supply and get replenish the supply. A combination of quantity-based and price-based pricing mechanisms can be used. First design prices for fixed time horizon, then manage product mix to maximize profits. As demands change, the quantities of offered products are changed to maximize revenue. Prices may change over the time horizon to meet shifting demands. As prices change the quantities of offered products are changed to maximize revenue.

In the context of bandwidth, as a product, bandwidth is perishable—the value of the product becomes 0 after the fact. Ensuring the product is sold is sometimes more important than keeping its price level where no one will buy it. Differential pricing increases revenues more than price discrimination. Price discrimination tracks demand with prices, but is not possible to do in practice. Forecasting and estimation of demands help guide product choices. Using the knowledge of past demands decide on a product-mix to be offered. Optimization require inputs that give them sufficient information about current demands, future demands, competition offerings, etc.

Long-term dynamic pricing is used to decide prices for products and the reservation levels for products are decided. Product mix and their portion to be obtain to maximize revenue over a "long" time horizon (e.g. for a season). Real-time yield management is used to maximize revenues when bandwidth is sold. Given the product mix (SLA types) fill available capacity (capacity) with appropriate products to increase revenue, such as, e.g., by limiting supply of cheaper products when appropriate. Since bandwidth has a price and it can be estimated how many of each type of bandwidth one expects before they all perish, one can decide which products to sell at which time. If the expected number of highly priced products are well-below what was expected to be sold, do not offer any of the cheaper bandwidth—price increases. If the expected number of highly priced products is still well-above what was expected to be sold, start offering cheaper bandwidth to increase the revenue with higher utilization—price decreases. This leads to the appearance of short-term "dynamic pricing"—prices change with the demand. Divide and conquer is required to have a computationally tractable problems with low complexity. Price optimization and yield management separate the mathematical problem into manageable components. Yield management is also split into network wide optimization and leg-by-leg optimization.

Figure 17:
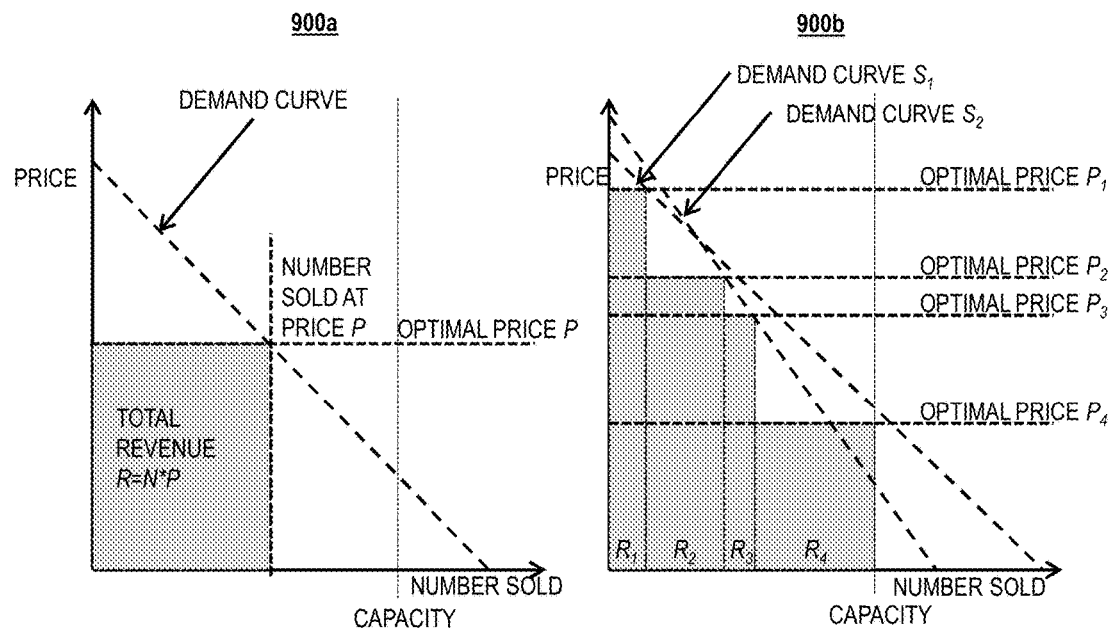
FIG. 17 is a graph showing that differential product pricing increases revenue through demand curves.

Referring to FIG. 17, in an exemplary embodiment, a graph illustrates that differential product pricing increases revenue through demand curves. If there is only a single product type (graph 900a) the demand curve has a single optimal price. The optimal price/demand point may not take full advantage of available capacity. The only way to raise profits is to decrease costs. If there are multiple product types (graph 900b), there is an optimal price for each product (produced in a joint optimization among products). Note, in the context of bandwidth, the products can be different types of services—e.g. a GbE, ODU2, wavelength, etc.; different types of SLA; etc. Various aspects of products in the network context include pipe (size, fixed, flexible), protection level (none, one-to-one, mesh), exclusiveness (fixed or variable bandwidth), flexibility, urgency of service (now, fixed, flexible), duration of service, etc. Each product type has its own optimal price. It is possible to fully fill capacity and maximize revenue. Optimal prices can be found with mathematical optimization, if the demand curve is known. The risk of using this technique is in the spill over from higher paying product classes into lower paying product classes. This can be attained by introducing different conditions on the products, which entice higher paying customers to pay more. Value-based pricing may help by offering premium products to premium customers.

Figure 18:
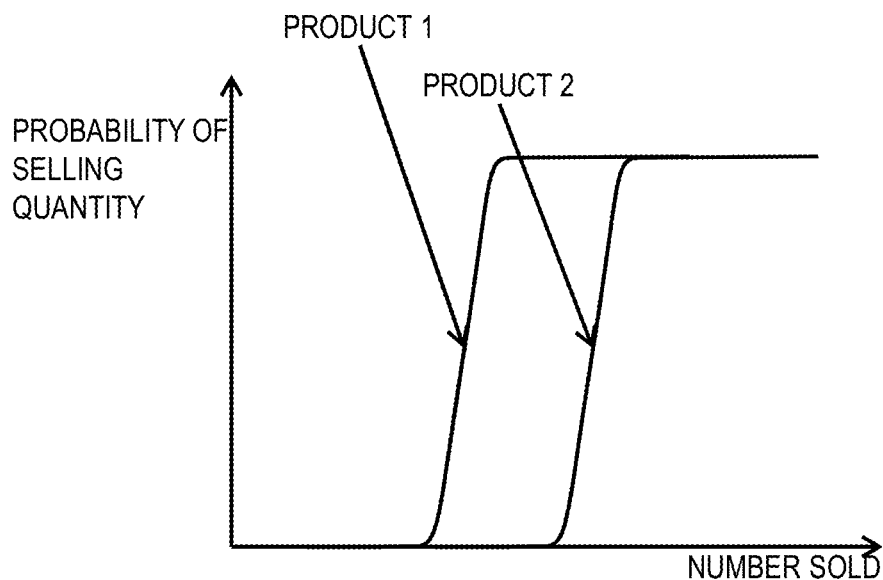
FIG. 18 are graphs of product quantity limits based on marginal product revenue.
Figure 18:
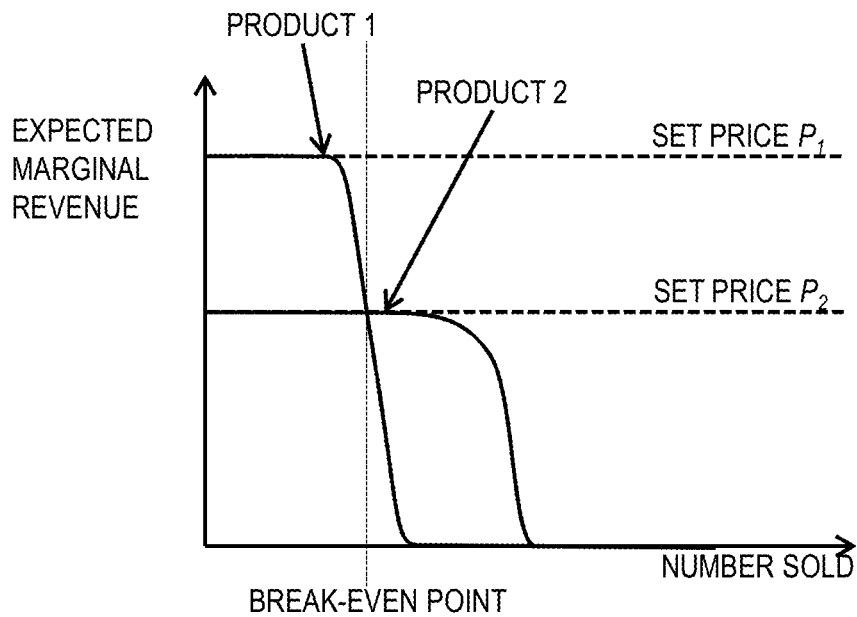

Referring to FIG. 18, in an exemplary embodiment, graphs illustrate product quantity limits based on marginal product revenue. Graph 900c is a graph of probability of selling a certain number of products 1, 2, and graph 900d is a graph of margin versus number sold. Given two products (product 1 more expensive than product 2) how many of each product should one sell to maximize revenue? For example, only sell cheaper product if the opportunity cost is less than its price. The products have a different expectation on the number of items that can be sold. Each product has an independent market demand, if the product segmentation is done correctly. The revenue of selling the cheaper product may exceed the revenue of selling the more expensive product if the number of items sold is sufficiently high. The problem becomes finding a break-even point where the expected revenue of selling a cheaper item is higher than the expected revenue of selling one more expensive item. The quantity-based selling strategy is to sell cheaper product only if we sold more of the more expensive product than its break-even point.

Multi-Layer Policy Management

The various management process examples described herein show the splitting of the management functions in each layer separate of other layers. Also, multiple layers (L0, L1, L2, etc.) can be supported with cross-layer optimization. Multiple layers can be combined in one optimization to produce multi-layer policies (e.g. one policy for each layer in the optimization). In this case, the policy is actually a pairing of policies managing multiple layers. Also, multiple layers can be supported with hierarchical policy determination. For example, the dynamic policy processes can be run for a lower layer first, which produces a set of policies and time-stamps. Next, run one layer up, by combining its time-stamps with the time-stamps of the lower layer (policy changes in the lower layer result in topology changes in the next layer up), i.e., run the policy calculation for the layer and repeat the process for the next layer.

Location of the Dynamic Policy Engine

The dynamic policy engine 302 described herein is a logical element which may reside in multiple locations in the network 10, the SDN management plane 300, etc. The dynamic policy engine 302 may be a library with static linkage to other components in the SDN management plane 300; a standalone application in the SDN controller 60, which may provide an interface to other applications; a standalone application using the SDN northbound interface for communication; a virtual network appliance providing services to other virtual network appliances in the control plane using Remote Procedure Call (RPC) or a network protocol for communications; a standalone network element providing services to other network elements or SDN controller applications using RPC or a network protocol for communications; a sub-module of the network analytics module 316; or the like. The dynamic policy engine 302 may be implemented on a single CPU hardware element or a hardware element containing special purpose hardware (e.g. graphical processing unit—GPU).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A dynamic policy method for implementing network management of a network, the dynamic policy method comprising:
pre-calculating management policies for the network, in an off-line manner, based on past observed network load taking into consideration seasonality of network load, forecasts of the network load, and planned events on the network load;
selecting a policy from the pre-calculated management policies, to manage the network in an on-line manner, wherein the selecting is either time-based or performance-based; and
performing network management functions in the network utilizing the selected policy to adjust one or more parameters in the network to change operation thereof,
wherein the network management functions are provided through a Software Defined Networking (SDN) management plane, and
wherein the pre-calculated management policies comprise administrative weight policies, routing and wavelength assignment policies, and channel assignment policies.

2. The dynamic policy method of claim 1, wherein the selected policy is reevaluated over time or based on detecting the network load has changed significantly enough to warrant a policy change.

3. The dynamic policy method of claim 1, wherein the pre-calculating is performed before real-time deadlines are needed to be met to perform the network management functions.

4. The dynamic policy method of claim 1, wherein the selected policy is maintained using a longest-hold approach where the selected policy is kept for as long as possible to keep network performance acceptable.

5. The dynamic policy method of claim 1, wherein the management policies further comprise dynamic pricing policies and zone assignment policies.

6. The dynamic policy method of claim 1, wherein the selecting is determined using a utility function for the management policies, which is determined through one of a formula, optimization technique, and simulation.

7. The dynamic policy method of claim 1, wherein the selecting is first time-based, selecting the selected policy based on a time-based policy look up, and second performance-based, adjusting to a different policy if the selected policy is not acceptable based on the network load.

8. The dynamic policy method of claim 1, wherein the management policies relate to performing Operations, Administration, Maintenance, and Provisioning (OAM&P) in the network, in an automated manner.

9. A management system configured to provide dynamic policy management for implementing network management of a network, the management system comprising:
a processor; and
memory storing instructions that, when executed, cause the processor to
pre-calculate management policies for the network, in an off-line manner, based on past observed network load taking into consideration seasonality of network load, forecasts of the network load, and planned events on the network load,
select a policy of the pre-calculated management policies, to manage the network in an on-line manner, wherein the selecting is either time-based or performance-based, and
perform network management functions in the network utilizing the selected policy to adjust one or more parameters in the network to change operation thereof,
wherein the network management functions are provided through a Software Defined Networking (SDN) management plane, and
wherein the pre-calculated management policies comprise administrative weight policies, routing and wavelength assignment policies, and channel assignment policies.

10. The management system of claim 9, wherein the selected policy is reevaluated over time or based on detecting the network load has changed significantly enough to warrant a policy change.

11. The management system of claim 9, wherein the off-line manner is performed before real-time deadlines are needed to be met to perform the network management functions.

12. The management system of claim 9, wherein the selected policy is maintained using a longest-hold approach where the selected policy is kept for as long as possible to keep network performance acceptable.

13. The management system of claim 9, wherein the management policies further comprise dynamic pricing policies and zone assignment policies.

14. The management system of claim 9, wherein the selecting is determined using a utility function for the management policies, which is determined through one of a formula, optimization technique, or simulation.

15. The management system of claim 9, wherein the selecting is first time-based, selecting the selected policy based on a time-based policy look up, and second performance-based, adjusting to a different policy if the selected policy is not acceptable based on the network load.

16. The management system of claim 9, wherein the management policies relate to performing Operations, Administration, Maintenance, and Provisioning (OAM&P) in the network, in an automated manner.

17. A network configured to provide dynamic policy management for implementing network management, the network comprising:

a plurality of nodes that are interconnected; and
a controller communicatively coupled to the plurality of nodes, wherein the controller comprises memory storing instructions that, when executed, cause the controller to
pre-calculate management policies for the network, in an off-line manner, based on past observed network load taking into consideration seasonality of network load, forecasts of the network load, and planned events on the network load,
select a policy of the pre-calculated management policies, to manage the network in an on-line manner, wherein the selecting is either time-based or performance-based, and
perform network management functions in the network utilizing the selected policy to adjust one or more parameters in the network to change operation thereof,
wherein the controller is a Software Defined Networking (SDN) controller, and
wherein the pre-calculated management policies comprise administrative weight policies, routing and wavelength assignment policies, and channel assignment policies.

* * * * *